(12) United States Patent
Saito et al.

(10) Patent No.: US 6,308,141 B1
(45) Date of Patent: Oct. 23, 2001

(54) METHOD OF AND APPARATUS FOR ANALYZING ALARMS OF AN INJECTION MOLDING MACHINE

(75) Inventors: Osamu Saito, Yamanashi; Noriaki Neko, Fujiyoshida; Noriko Ogawa, Yamanashi, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/210,791

(22) Filed: Dec. 15, 1998

(30) Foreign Application Priority Data

Dec. 15, 1997 (JP) .................................................... 9-363170

(51) Int. Cl.⁷ .................................................... G06F 17/00
(52) U.S. Cl. ............................................ 702/179; 425/542
(58) Field of Search ............................. 702/179; 425/542, 425/522; 706/904, 912; 700/197; 264/45.2

(56) References Cited

U.S. PATENT DOCUMENTS

| | | | |
|---|---|---|---|
| 5,344,301 | * 9/1994 | Kamiguchi et al. | ................. 425/169 |
| 5,470,218 | * 11/1995 | Hillamn et al. | ....................... 425/144 |
| 5,539,650 | * 7/1996 | Hehl | ................................ 364/476.05 |
| 5,586,041 | * 12/1996 | Mangrulkar | ...................... 364/474.16 |

* cited by examiner

Primary Examiner—Kamini Shah
Assistant Examiner—Edward Raymond
(74) Attorney, Agent, or Firm—Staas & Halsey LLP

(57) ABSTRACT

A method of and an apparatus for analyzing alarms of an injection molding machine, in which the relation between the alarm and the production time can be grasped clearly and also various kinds of statistical processing can be performed in accordance with operator's request. The ratio of the number of alarm occurrences and the occurrence time to an assigned production time is analyzed and displayed by numerical values or a graph. Thereby, an effect caused by the length of substantial operating time (production time) of injection molding machine can be eliminated, and the occurrence of alarms, which is an essential problem, can be evaluated objectively.

24 Claims, 26 Drawing Sheets

FIG. 2

MOLD 24 [ALARM HISTORY]

FILE <F>  DISPLAY <V>  ANALYSIS <A>  WINDOW <W>  HELP <H>

97/10/09    22:31    ANALYSIS PERIOD    97/01/10 ~ 97/10/09

[ALARM HISTORY]

| DATE AND TIME OF OCCURRENCE | | CODE | CONTENT |
|---|---|---|---|
| 97/08/20 | 10 : 33 : 56 | 204 | SERIAL PULSE CODER IS IN TROUBLE (SCREW) |
| 97/07/03 | 18 : 13 : 11 | 4 | RETURN TO ORIGIN (SCREW) |
| 97/06/11 | 15 : 20 : 06 | 3 | ALARM OF SERVO SYSTEM |
| 97/06/10 | 08 : 43 : 31 | 83 | TEMPERATURE OF BARREL (3) IS TOO HIGH |
| 97/06/10 | 08 : 40 : 43 | 82 | TEMPERATURE OF BARREL (2) IS TOO HIGH |
| 97/06/10 | 08 : 33 : 58 | 13 | OVERHEAT PREVENTIVE CIRCUIT IS OPERATING |
| 97/06/10 | 08 : 31 : 51 | 84 | TEMPERATURE OF BARREL (4) IS TOO HIGH |
| 97/06/10 | 08 : 23 : 37 | 81 | TEMPERATURE OF BARREL (1) IS TOO HIGH |
| 97/06/10 | 08 : 20 : 25 | 8 | MOTOR IS OVERLOADED (INJECTION UNIT) |
| 97/06/10 | 08 : 16 : 24 | 84 | TEMPERATURE OF BARREL (4) IS TOO HIGH |
| 97/06/10 | 08 : 15 : 54 | 80 | TEMPERTURE UNDER HOPPER IS TOO HIGH |

FIG. 5

| ALARM ID | START DATE/TIME | END DATE/TIME | ALARM CODE | ALARM GROUP | PRODUCT NO. | SCHEDULE NO. | RESIN TYPE |
|---|---|---|---|---|---|---|---|
| 000001 | 97/07/21 01:10 | 97/07/21 01:35 | 30 | 1 | 00071 | 00070 | 107 |
| 000002 | 97/07/24 02:55 | 97/07/24 03:05 | 201 | 4 | 00071 | 00070 | 107 |
| 000003 | 97/07/24 03:30 | 97/07/24 03:32 | 99 | 3 | 00071 | 00070 | 107 |
| 000004 | 97/07/24 11:12 | 97/07/24 13:40 | 97 | 3 | 00071 | 00070 | 107 |
| 000005 | 97/07/25 05:22 | 97/07/25 06:02 | 99 | 3 | 00071 | 00070 | 107 |
| 000006 | 97/07/25 07:00 | 97/07/25 07:01 | 51 | 2 | 00071 | 00070 | 107 |
| 000007 | 97/07/26 09:31 | 97/07/26 09:40 | 65 | 2 | 00104 | 00002 | 500 |
| 000008 | 97/07/26 09:42 | 97/07/26 09:43 | 65 | 2 | 00104 | 00002 | 500 |

FIG. 7

| SCHEDULE ID | START DATE/TIME | END DATE/TIME | SCHEDULE NO. | PRODUCT NO. | RESIN TYPE |
|---|---|---|---|---|---|
| 1 | 97/07/05 17:00 | 97/07/06 12:21 | 00070 | 00071 | 107 |
| 2 | 97/07/06 17:00 | 97/07/07 14:10 | 00070 | 00071 | 107 |
| 3 | 97/07/07 17:00 | 97/07/09 23:04 | 00018 | 00018 | 310 |
| 4 | 97/07/10 10:00 | 97/07/11 04:05 | 00054 | 00018 | 310 |
| 5 | 97/07/11 10:00 | 97/07/14 00:31 | 00054 | 00018 | 310 |
| 6 | 97/07/14 10:00 | 97/07/16 08:10 | 00054 | 00018 | 310 |
| 7 | 97/07/17 10:00 | 97/07/18 15:40 | 00070 | 00071 | 107 |

FIG. 9

| ALARM ID | MACHINE NO. | START DATE/TIME | END DATE/TIME | ALARM CODE | ALARM GROUP | PRODUCT NO. | SCHEDULE NO. | RESIN TYPE |
|---|---|---|---|---|---|---|---|---|
| 000001 | 5 | 97/07/21 12:10 | 97/07/21 12:20 | 30 | 1 | 00071 | 00070 | 107 |
| 000002 | 8 | 97/07/22 02:55 | 97/07/22 12:55 | 201 | 4 | 00075 | 00073 | 190 |
| 000003 | 3 | 97/07/22 03:34 | 97/07/22 03:35 | 99 | 3 | 00250 | 00037 | 402 |
| 000004 | 1 | 97/07/22 03:40 | 97/07/22 05:40 | 97 | 3 | 00250 | 00037 | 402 |
| 000005 | 2 | 97/07/22 05:22 | 97/07/23 03:22 | 99 | 3 | 00250 | 00037 | 402 |
| 000006 | 10 | 97/07/23 07:00 | 97/07/23 09:00 | 51 | 2 | 00071 | 00041 | 955 |
| 000007 | 23 | 97/07/23 09:31 | 97/07/23 10:31 | 65 | 2 | 00104 | 00002 | 500 |
| 000008 | 7 | 97/07/23 09:37 | 97/07/23 09:38 | 65 | 2 | 00032 | 00083 | 221 |

FIG. 10

| SCHEDULE ID | MACHINE NO. | START DATE/TIME | END DATE/TIME | SCHEDULE NO. | PRODUCT NO. | RESIN TYPE |
|---|---|---|---|---|---|---|
| 1 | 5 | 97/07/05 17:00 | 97/07/06 12:21 | 00071 | 00071 | 107 |
| 2 | 3 | 97/07/05 17:00 | 97/07/06 23:55 | 00070 | 00071 | 107 |
| 3 | 1 | 97/07/05 17:30 | 97/07/06 23:04 | 00073 | 00051 | 118 |
| 4 | 2 | 97/07/05 17:30 | 97/07/06 13:50 | 00065 | 00067 | 107 |
| 5 | 6 | 97/07/05 17:30 | 97/07/06 03:15 | 00015 | 00114 | 108 |
| 6 | 7 | 97/07/05 17:30 | 97/07/07 17:30 | 00059 | 00025 | 108 |
| 7 | 8 | 97/07/05 17:30 | 97/07/07 17:21 | 00059 | 00026 | 118 |

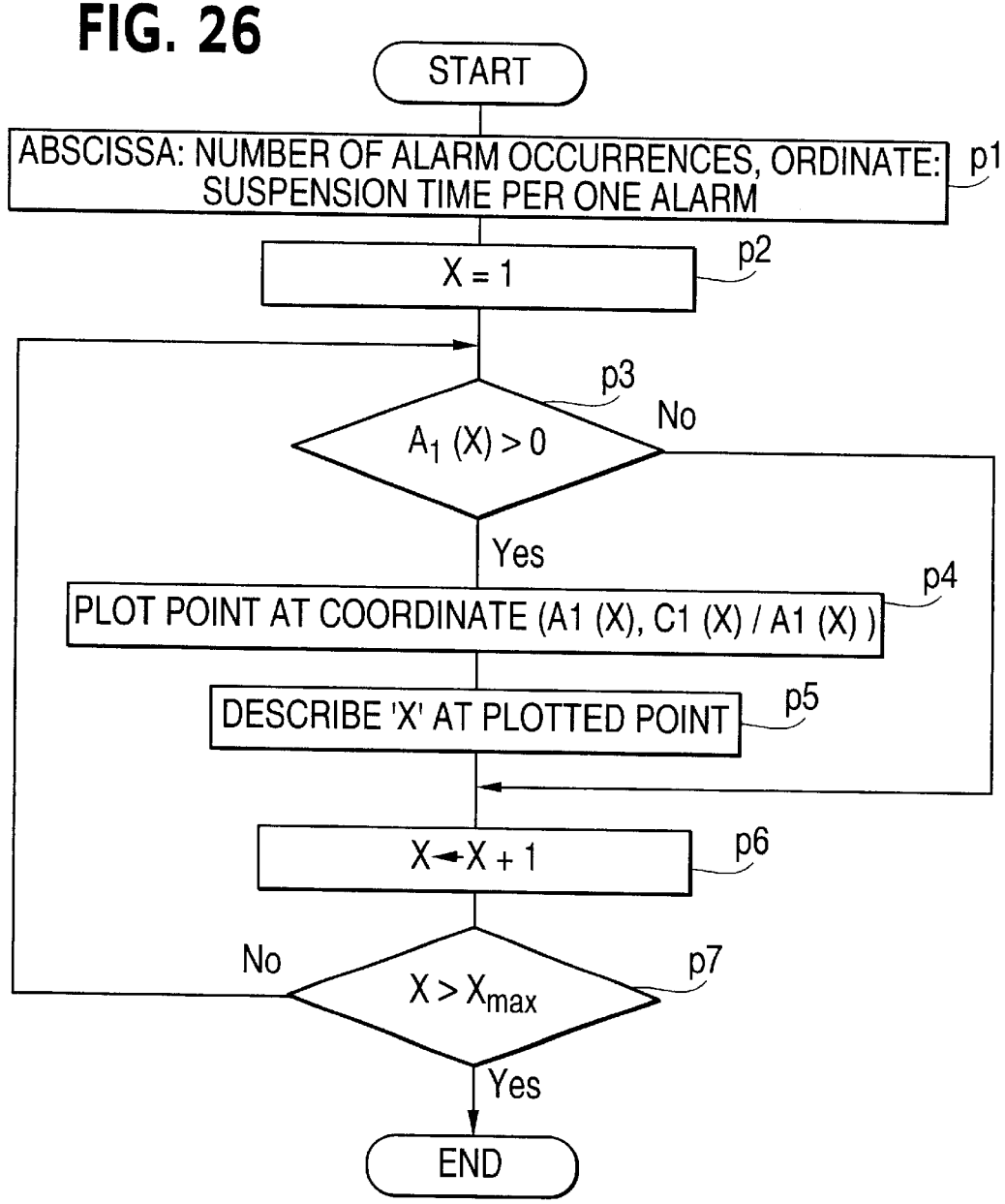

METHOD OF AND APPARATUS FOR ANALYZING ALARMS OF AN INJECTION MOLDING MACHINE

BACKGROUND OF THE INVENTION

1. Field of the Invention

The present invention relates to a method of and an apparatus for analyzing alarms of an injection molding machine.

2. Description of the Related Art

As an apparatus for analyzing an operating state of an injection molding machine, there is proposed an operating time analyzer for individually summing up and displaying time periods of manual operation, an automatic operation and an alarm occurrence in Japanese Patent Publication No. 4-341817. However, this apparatus merely sums up and displays the alarm occurrence time and cannot clearly provide a relationship between the alarm and the production time etc.

As a molding trouble display method for displaying trouble history of an injection molding machine, there is proposed a method in which alarm items are classified and edited and displayed on a monitor in Japanese Patent Publication No. 7-241896. However, this method merely displays the alarm items by rearranging them according to the number of alarms and cannot necessarily perform the statistical processing intended by an operator.

SUMMARY OF THE INVENTION

An object of the present invention is to provide a method of and an apparatus for analyzing alarms of an injection molding machine in which the relation between the alarm and the production time can be grasped clearly and also various kinds of statistical processing can be performed in accordance with an operator's request.

According to the present invention, the number of alarms, a ratio of the number of alarms to operating time of an injection molding machine or a ratio of the number of alarms of a selected item to the total number of alarms is totalized and displayed with respect to a time zone, a type of resin used or a production schedule. Also, the suspension time caused by alarms, a ratio of the suspension time to the operating time or a ratio of the suspension time to the number of alarms is totalized and displayed with respect to an item selected from items of a time zone, a product, a type of alarm, an alarm group, a resin used and production schedule.

Further, the number of alarms, a ratio of the number of alarms to the production time or a ratio of the number of alarms on a selected item to the total number of alarms are totalized and displayed with respect to combined two or more items selected from items of a time zone, a product, a type of alarm, an alarm group, a type of resin used and a production schedule. Also, the suspension time caused by an alarm, a ratio of the suspension time to the operating time or a ratio of the suspension time to the number of alarms is totalized and displayed with respect to combined two or more items selected from items of a time zone, a product, a type of alarm, an alarm group, a type of resin used and a production schedule. Thereby, various kinds of statistical processing can be performed in accordance with operator's request.

Further, using a host computer connected to a plurality of injection the ratio of the number of alarms to the operating time or the ratio of the number of alarms on a selected item to the total number of alarms is totalized and displayed with respect to an item selected from items of each injection molding machine, a time zone, a product, a type of resin used and a production schedule. Also, using a host computer connected to a plurality of injection molding machines through a data transmission path, the suspension time caused by alarms, the ratio of the suspension time to the operating time or the ratio of the suspension time caused by alarms of a selected item to the total number of alarms is totalized and displayed with respect to an item selected from items of each injection molding machine, a time zone, a product, a type of alarm, an alarm group, a type of resin used and a production schedule. By this arrangement, alarm data of the plurality of injection molding machines are concentratedly analyzed.

Further, using a host computer connected to a plurality of injection molding machines through a data transmission path, the number of alarms, the ratio of the number of alarms to the operating time or the ratio of the number of alarms of an item to the total number of alarms is totalized and displayed with respect to combined two or more items selected from items of each injection molding machine, a time zone, a product, a type of alarm, an alarm group, a type of resin used and a production schedule. Also, using a host computer connected to a plurality of injection molding machines through a data transmission path, the ratio of the suspension time caused by alarms to the operating time or the ratio of the suspension time to the number of alarms is totalized and displayed with respect to combined two or more items selected from items of each injection molding machine, a time zone, a product, a type of alarm, an alarm group, a resin used and or a production schedule. Thereby, the concentrated control of data and various kinds of statistical processing in accordance with operator's request can be performed.

Further, the period for totalizating on each item can be designated arbitrarily within a period for which the data of alarm and operation are collected, and the totalized data for a desired period can be taken out easily.

The aforementioned various totalizing results are displayed by numerical values or a graph.

Also, a relationship between the number of alarms and an average operation suspension time for one alarm is displayed for each element of aforesaid item by a graph. Thereby, a relationship between a probability of alarm occurrence and suspension time of molding operation caused by one occurrence, a degree of adverse effect caused by a specific alarm element on the final efficiency of molding operation, a priority of alarm element for which the problem should be solved and the like can clearly be judged visually.

Further, by displaying contour lines on which a product of the number of alarms and the average suspension time is a set value, on a graph, a degree of effect caused by each element of alarm on the molding operation can be grasped easily.

BRIEF DESCRIPTION OF THE DRAWINGS

FIG. 2 is a view showing one example of an alarm history display screen displayed on a host computer of this embodiment;

FIG. 5 is a schematic view showing an alarm data storage file of a CNC unit of an injection molding machine in this embodiment;

FIG. 7 is a schematic view showing a production result data storage file of a CNC unit of an injection molding machine in this embodiment;

FIG. 9 is a schematic view showing an alarm data storage file generated by a host computer;

FIG. 10 is a schematic view showing a production result data storage file generated by a host computer;

FIG. 26 is a flowchart showing display processing of the importance judgment graph.

DETAILED DESCRIPTION OF THE PREFERRED EMBODIMENTS

Figure 1:
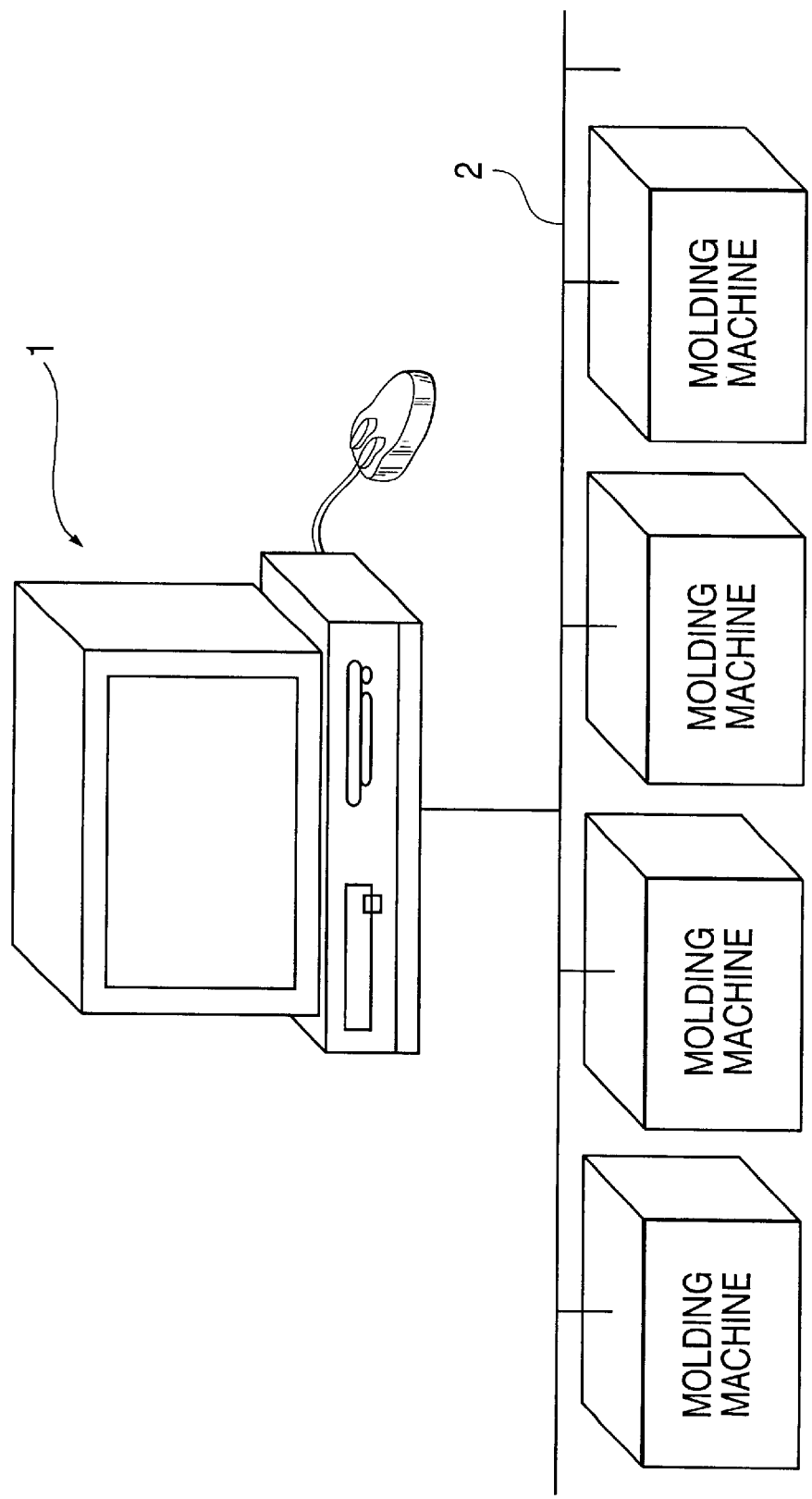
FIG. 1 is a schematic view showing one example of an injection molding work facility according to one embodiment to which an alarm analyzing method of the present invention is applied.

FIG. 1 is a schematic view showing one example of an injection molding work facility according to one embodiment to which an alarm analyzing method of the present invention is applied. FIG. 1 shows a facility configured so that data are collected from a plurality of injection molding machines via a data transmission path 2 by a host computer 1 consisting of a personal computer etc. The host computer 1 is provided with data input means such as a keyboard and mouse and a monitor etc. Each of the injection molding machines is correspondingly equipped with a CNC unit as a dedicated controller.

First, the alarm data collection processing executed by the CNC unit of each injection molding machine will be described with reference to the flowchart shown in FIG. 4.

Like the conventional apparatus, the CNC unit of each injection molding machine has a function of detecting a trouble in molding work including an abnormal temperature of an injection cylinder and a metering trouble and a trouble of the injection molding machine itself including a trouble of a servo system or an over-travel of a movable member. The code of alarm occurring at the present time is automatically stored in an alarm detecting register N.

Further, the CNC unit of the injection molding machine of this embodiment is provided with an alarm code storage register M for storing only the latest one of the values of alarms which occurred in the past.

Figure 4:
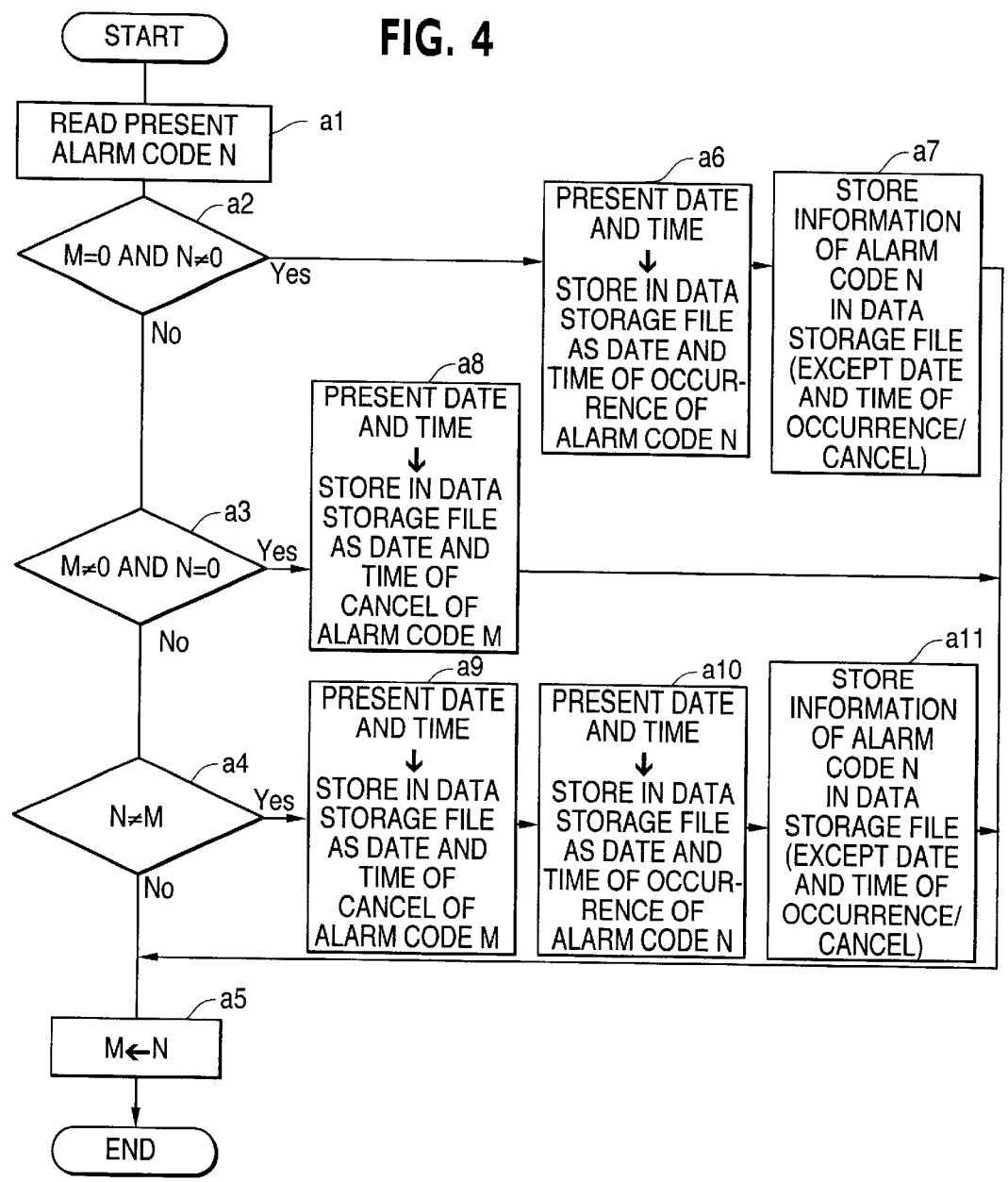
FIG. 4 is a flowchart showing the outline of alarm data collection processing executed by a CNC unit of each injection molding machine.

The CNC unit of the injection molding machine, which started alarm data collection processing in each predetermined cycle according to the flowchart shown in FIG. 4, first reads the alarm code stored in the alarm detecting register N at this time (Step a1), and then judges whether that value is a value other than zero, that is, whether any alarm occurrence regarding the molding work and the injection molding machine itself is stored in the alarm detecting register N, and whether zero is stored in the alarm code storage register M, in effect, whether the alarm occurrence continuing from the previous processing cycle is stored in the alarm code storage register M (Step a2).

If the judgment result of Step a2 is Yes, that is, if the value of the alarm code storage register M is zero and any alarm code is stored in the alarm detecting register N, the result means that no alarm has been detected for a while and a new alarm is detected in this processing cycle. Therefore, the CNC unit of the injection molding machine stores the alarm code stored in the alarm detecting register N and the present date and time, that is, the date and time when the alarm detected at this time occurs, in an alarm data storage file of the CNC unit (Step a6). Further, the CNC unit reads the code of alarm group to which the alarm N belongs, the information concerning the product which is being molded by the injection molding machine at present, and other information from an alarm code file, a schedule control file (not shown) for the injection molding machine, etc., and stores these data, in addition to the alarm code N and the date and time of occurrence, in each field of the same record in the alarm data storage file (Step a7).

The alarm group described here consists dividedly of, for example, an alarm group relating to abnormal temperature, an alarm group relating to a trouble of electrical system, an alarm group relating to an operation error, an alarm group relating to a trouble of motor, and an alarm group relating to a trouble of controller. However, the alarms can be grouped at a higher level of concept, for example, into a molding facility alarm group relating to a molding facility such as a molding machine, mold, temperature controller, dryer, and take-out device, and a product element alarm group relating to an element constituting a product itself including a trouble of resin and insert member.

One example of the alarm data storage file provided in the CNC unit of the injection molding machine is shown in FIG. 5.

As shown in FIG. 5, the alarm data storage file has fields for storing data of items of Start Date/Time, End Date/Time, Alarm Code, Alarm Group, Production No., Schedule No., and Resin Type for each Alarm ID, that is, for each record corresponding to the series number constituting the address. Of these items, only the data of Start Date/Time (the date and time when the alarm detected at this time occurred) and Alarm Code are stored by the processing in Step a6.

Also, in the processing in Step a7, the alarm code file, schedule control file, etc. of the injection molding machine are referred to by the CNC unit, and Alarm Group (the code of alarm group to which the present alarm belongs) and the information concerning the product which is being molded by the injection molding machine at present, such as Product No. (product code), Schedule No. (schedule code), and Resin Type (resin code), are stored in the corresponding field of the same record as described before in the alarm data storage file.

If the judgment result of Step a2 is No, the CNC unit further judges whether the value of the alarm detecting register N is zero, that is, whether a new alarm is detected in the present processing cycle, and whether the value of the alarm code storage register M is a value other than zero, in effect, the alarm occurrence continuing from the previous processing cycle is stored in the alarm code storage register M (Step a3).

If the judgment result of Step a3 is Yes, that is, if the value of the alarm code storage register M is a value other than zero and an alarm code is not stored in the alarm detecting register N, the result means that the alarm M having been detected for a while is canceled in the present processing cycle. Therefore, the CNC unit of the injection molding machine stores the present date and time, that is, the date and time when the alarm code stored in the alarm code storage register M is canceled, in the field of the same record as described before in the alarm data storage file of the CNC unit so as to correspond to the aforesaid alarm code M (Step a8).

That is to say, in the field of End Date/Time (date and time of alarm end) in the alarm data storage file, which has been blank in the process of Steps a6 and a7, the date and time of alarm end is written a this time. As described later, in some cases, the equivalent processing to this processing is performed by the processing of Step a9.

If the judgment result of Step a3 is No, the CNC unit judges whether the value of the alarm detecting register N and the value of the alarm code storage register M are different from each other (Step a4).

If the judgment result of Step a4 is Yes, that is, if the value of the alarm detecting register N and the value of the alarm code storage register M are different from each other, the result means that the occurrence of a new alarm N is detected in place of the alarm M continuing from the previous processing cycle. Therefore, the CNC unit of the injection molding machine stores the present date and time, that is, the date and time when the previous alarm code stored in the alarm code storage register M is canceled, in the field of the same record as described before in the alarm data storage file of the CNC unit so as to correspond to the aforesaid alarm code M (Step a9). Further, the CNC unit stores the same present date and time in the corresponding field of the next record in the alarm data storage file as the date and time of the occurrence of a new alarm code N (Step a10). Further, the CNC unit reads the code of alarm group to which that alarm cade N belongs and the information concerning the product which is being molded by the injection molding machine at present from the alarm code file, the schedule control file, etc. of the injection molding machine in the same way as described before, and stores these data, in addition to the alarm code N and the date and time of occurrence, in the corresponding field of the same record in the alarm data storage file (Step a11).

If the judgment result of Step a4 is No, the result means that the value of the alarm code register M and the value of the alarm detecting register N agree with each other, and the state in which no alarm occurs continues (in the case of M=N=0) or the state in which the same alarm occurs continues (in the case of M=N≠0). In this case, therefore, processing regarding the writing of the alarm data storage file is not performed.

Next, the CNC unit of the injection molding machine transfers the value of the alarm detecting register N to the alarm code storage register M, and re-stores the alarm information N detected in the present cycle as the alarm information M in the previous cycle for the alarm data collection processing in the next processing cycle (Step a5). Thus, the alarm data collection processing in this cycle is finished.

As the result that the aforementioned processing is executed repeatedly in each predetermined cycle, in the alarm data storage file are finally stored the items of Start Date/Time (date and time of alarm occurrence), End Date/Time (date and time of alarm end), Alarm code, Alarm Group (alarm group code), Product No. (product code), Schedule No. (schedule code), and Resin Type (resin code) in the field of each record in time sequence corresponding to the occurrence state of alarm as shown in FIG. 5. Alarm ID is merely an address value, having no special meaning.

Next, the production result data collection processing performed by the CNC unit of each injection molding machine in each predetermined cycle will be described with reference to the flowchart shown in FIG. 6.

Figure 6:
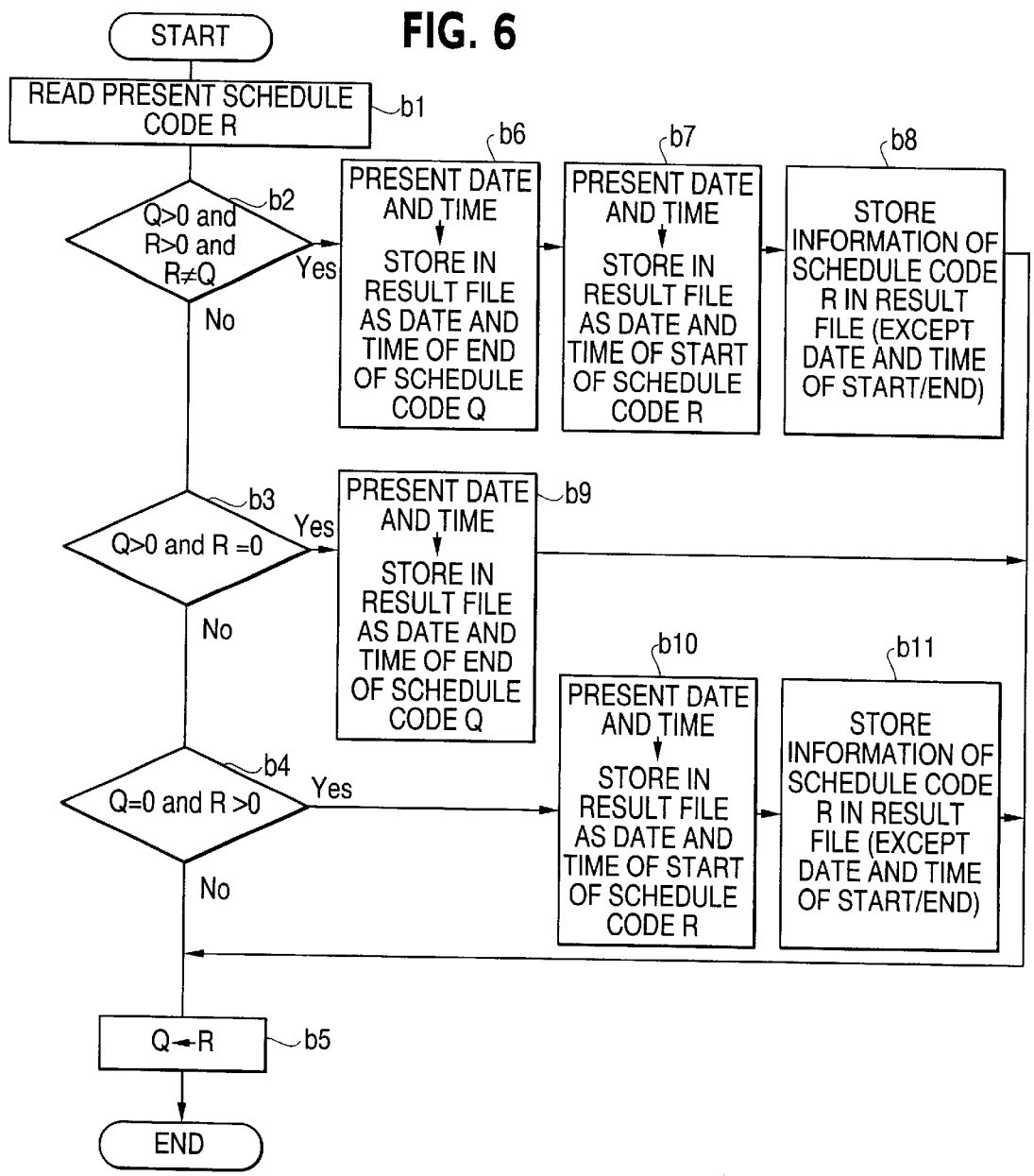
FIG. 6 is a flowchart showing the outline of production result data collection processing executed by a CNC unit of each injection molding machine.

The CNC unit of the injection molding machine, which started production result data collection processing in each predetermined cycle according to the flowchart shown in FIG. 6, first reads the schedule code stored in a schedule code detecting register R at the present time, that is, the number of the molding schedule being executed at present (Step b1), and judges whether the value of the schedule code detecting register R and the value of a schedule code storage register Q which stores only the latest one of the values of schedule code executed in the past are larger than zero, and whether the value of the schedule code detecting register R and the value of the schedule code storage register Q are different from each other (Step b2).

If the judgment result of Step b2 is Yes, that is, if the value of the schedule code detecting register R and the value of the schedule code storage register Q are different from each other and both of these values are larger than zero, the result means that the injection molding work of schedule code Q having executed up to this time is finished and the injection molding work of the next schedule, in effect, the injection molding work of schedule code R is newly started. Therefore, the CNC unit stores the present date and time, that is, the date and time when the injection molding work having been stored in the schedule code storage register Q is finished, in a field of a production result data storage file of the CNC unit so as to correspond to the aforesaid schedule code Q (Step b6). Further, the CNC unit stores, together with the schedule code R, the same present date and time in the corresponding field of the next record in the production result data storage file as the date and time when a new injection molding work is started (Step b7). Further, the CNC unit reads the information concerning the schedule R from the schedule control tile etc. of the injection molding machine, and stores the data in the production result data storage file so as to correspond to the field of schedule code R (Step b8).

One example of the production result data storage file provided in the CNC unit of the injection molding machine is shown in FIG. 7.

As shown in FIG. 7, the production result data storage file has fields for storing data of items of Start Date/Time, End Date/Time, Schedule No., Production No., and Resin Type for each record corresponding to the serial number constituting the address. Of these items, the item in which data is stored by the processing in Step b6 is End Date/Time corresponding to the schedule code Q in which the molding work is finished. For example, if the molding work of schedule code Q=70 is finished and the molding work of schedule code R=18 is started, the present date and time is written in the field of End Date/Time in the record of schedule code Q=70.

Also, in the processing in Step b7, the same present date and time is written in the field of the next record, in effect, in the field of Start Date/Time in the record of schedule code R=18. Also, by the processing in Step b8, schedule code R=18 is written in the field of Schedule No. in the record of schedule code R=18. Further, the data corresponding to schedule code R=18 read from the schedule control file etc. of the injection molding machine by the processing in Step b8, in effect, the Product No. and Resin Type are written in the fields of Product No. and Resin Type in the record of schedule code R=18.

If the judgment result of Step b2 is No, the CNC unit further judges whether the schedule code stored in the schedule code detecting register R at this time is zero, and whether the value of the schedule code storage register Q is larger than zero (Step b3).

If the judgment result of Step b3 is Yes, the result means that the molding work of schedule code Q having been executed by the injection molding machine up to this time is finished, and moreover the value of the schedule code detecting register R is zero and the injection molding work of the next schedule is not started. Therefore, the CNC unit stores the present date and time, that is, the date and time when the injection molding work having been stored in the schedule code storage register Q is finished, in the field of the production result data storage file of the CNC unit so as to correspond to the aforesaid schedule code Q in the same way as the processing in Step b6 (Step b9).

If the judgment result of Step b3 is No, the CNC unit further judges whether the schedule code stored in the schedule code detecting register R at this time is a value other than zero, and whether the value of the schedule code storage register Q is zero (Step b4).

If the judgment result of Step b4 is Yes, the result means that the value of the schedule code storage register Q is zero, and the injection molding machine which has been in a suspension state started the next injection molding work again. Therefore, the CNC unit stores, together with the schedule code R, the present date and time in the corresponding field of the next record in the production result data storage file as the date and time when new injection molding work of schedule code R is started (Step b10). Further, the CNC unit reads the information concerning the schedule code R, that is, the Product No. and Resin Type from the schedule control file etc. of the injection molding machine, and stores the data in the production result data storage file so as to correspond to the field of schedule code R (Step b11).

If the judgement result of Step b4 is No, the result means that the value of the schedule code storage register Q and the value of the schedule code detecting register R are equal to each other, and the state in which the injection molding work is not executed continues (in the case of Q=R=0) or the injection molding work of the same schedule code continues (in the case of Q=R≠0). In this case, therefore, the processing regarding the writing of the production result data storage file is not performed.

Then, the CNC unit of the injection molding machine transfers the value of the schedule code detecting register R to the schedule code storage register Q, and re-stores the schedule code R (R=0 when the injection molding work is not executed) of the injection molding work being executed in this cycle as the schedule code Q of the injection molding work executed in the previous cycle for the production result data collection processing in the next processing cycle (Step b5). Thus, the production result data collection processing in this cycle is finished.

As the result that the aforementioned processing is executed repeatedly in each predetermined cycle, in the production result data storage file are finally stored the data of the items of Start Date/Time (date and time of start of molding work), End Date/Time (date and time of end of molding work), Schedule No. (schedule code), Product No. (product code), and Resin Type (resin code) in the field of each record in time sequence corresponding to the serial number constituting the address as shown in FIG. 7.

The above is a description of the case where the CNC unit of the injection molding machine is provided with the alarm data storage file and the production result data storage file as one example. When the data are controlled collectively on the side of the host computer 1, in place of the alarm data collection processing and production result data collection processing on the side of the CNC unit, the values of the alarm detecting register N and alarm code storage register M and the values of the schedule code detecting register R and schedule code storage register Q are transferred from the CNC unit of each injection molding machine to the host computer 1 via the data transmission path 2.

In some cases, the alarm data storage file and the production result data storage file are provided in both of the CNC unit of the injection molding machine and the host computer 1. In this case, each time the alarm data or the production result data is newly stored in the CNC unit of the injection molding machine, the data is transferred to the side of the host computer 1. Therefore, it is necessary only that the latest one data can be stored at a minimum in the alarm data storage file and the production result data storage file on the side of the CNC unit.

Figure 8:
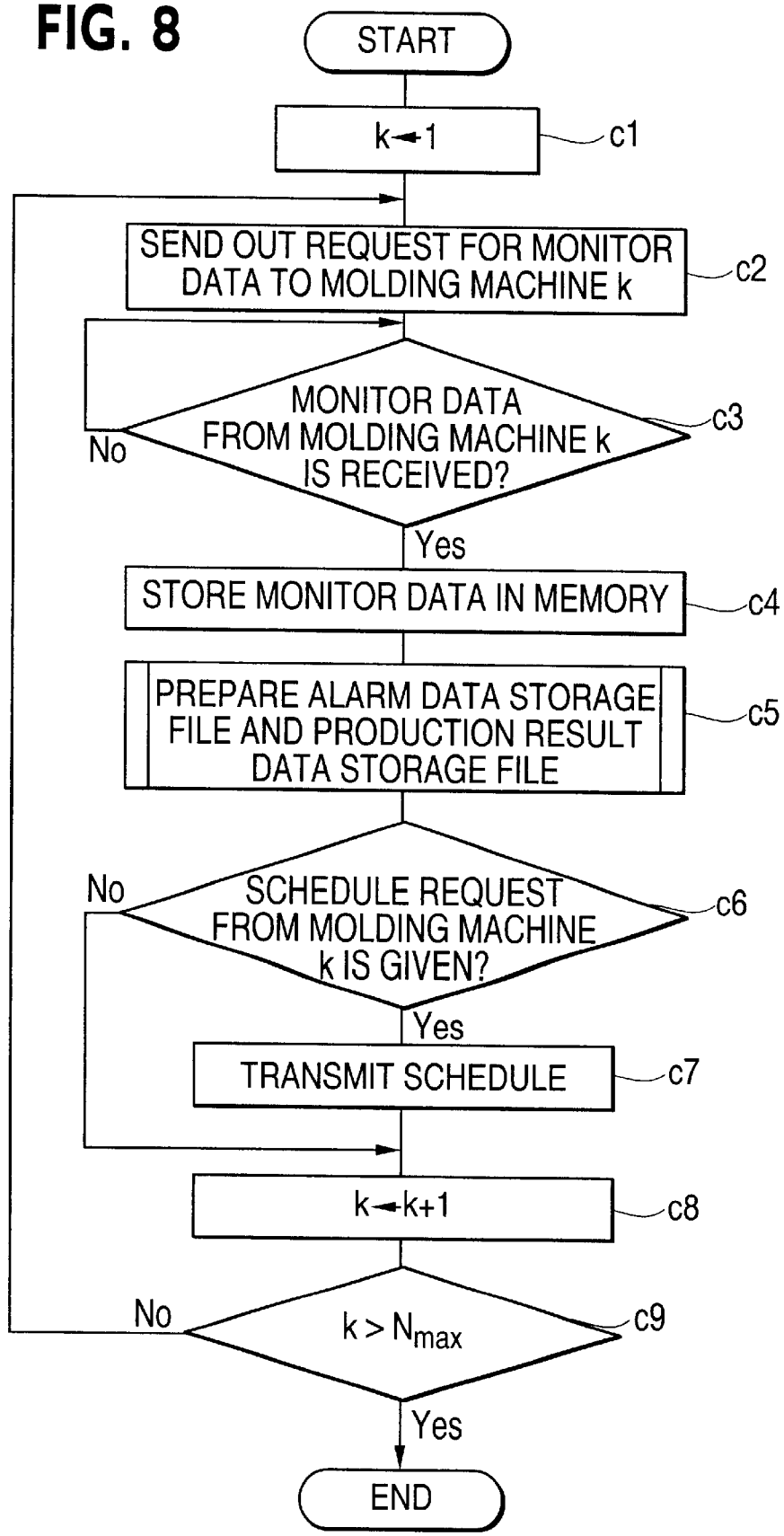
FIG. 8 is a flowchart showing alarm data collection processing and production result data collection processing executed by a host computer.

FIG. 8 briefly shows processing in each predetermined cycle in the case where the data are controlled collectively on the side of the host computer 1 to generate the alarm data storage file and the production result data storage file.

The host computer 1 first initializes the value of index k for identifying Machine No. of the injection molding machine with which the host computer 1 communicates to 1 (Step c1), and establishes a communication state with the CNC unit of the injection molding machine of Machine No. (k) based on the value of the index k (Step c2). Then, the host computer 1 waits until the data in the alarm detecting register N, alarm code storage register M, schedule code detecting register R, schedule code storage register Q, and the like are transferred from the CNC unit (Step c3), and temporarily stores the data in a memory after the data are transferred.

Next, the host computer 1 performs the processing equivalent to the alarm data collection processing shown in FIG. 4 based on the data of the alarm detecting register N, alarm code storage register M, and the like stored in the memory, and stores the data of the items of Start Date/Time (date and time of alarm occurrence), End Date/Time (date and time of alarm end), Alarm Code, Alarm Group (alarm group code), Product No. (product code), Schedule No. (schedule code), and Resin Type (resin code) in an alarm data storage file in the host computer 1 so as to correspond to the aforesaid Machine No. (k) (Step c5).

The alarm data storage file in the host computer 1, shown in FIG. 9, is the same as the alarm data storage file shown in FIG. 5 except that Machine No. is present.

The host computer 1 further performs the processing equivalent to the production result data collection processing shown in FIG. 6 based on the data of the schedule code detecting register R, schedule code storage register Q, and the like stored in the memory, and stores the data of the items of Start Date/Time (date and time of start of molding work), End Date/Time (date and time of end of molding work), Schedule No. (schedule code), Product No. (product code), and Resin Type (resin code) in a production result data storage file in the host computer 1 so as to correspond to the aforesaid Machine No. (k) (Step c5).

The production result data storage file in the host computer 1, shown in FIG. 10, is the same as the production result data storage file shown in FIG. 7 except that Machine No. is present.

After finishing the registration processing of data in the alarm data storage file and the production result data storage file, the host computer 1 then judges whether the transfer request for schedule data is given from the CNC unit of injection molding machine of Machine No. (k) (Step c6). If the transfer request is given, the host computer 1 transfers the data such as Schedule No., Product No., Resin Type, scheduled date and time of start of molding, and scheduled date and time of end of molding regarding the next operation schedule to the CNC unit of injection molding machine of Machine No. (k) (Step c7).

Needless to say, when the schedule data are set manually in the CNC unit of the injection molding machine, or when the schedule control file is provided in the CNC unit itself of the injection molding machine, the processing in Step c7 need not be performed.

Next, the host computer 1 adds 1 to the value of the index k (Step c8), and judges whether the value of the index k exceeds the value of the final value Nmax of Machine No. of injection molding machine (Step c9).

If the value of the index k does not exceed the value of the final value Nmax, the judgment result means that there is another injection molding machine which must register the data in the alarm data storage file and the production result data storage file of the host computer 1. Therefore, the host computer 1 connects with the CNC unit of the next Machine No. in the same way as described before based on the value of the index k updated by the processing in Step c8, executes the processing in Steps c2 to c9 repeatedly, and takes in the data of each injection molding machine in succession in the alarm data storage file and the production result data storage file of the host computer 1.

Finally, if the value of the index k exceeds the value of the final value Nmax of Machine No. of injection molding machine, and the data collection for all injection molding machines connected to the host computer 1 via the data transmission line 2 is finished, the judgment result of Step c9 becomes Yes, so that the processing in one processing cycle in the host computer 1 is completed.

As the result that the aforementioned processing is executed repeatedly by the host computer 1, in the alarm data storage file in the host computer 1 are finally stored the data of the items of Machine No. (machine number of injection molding machine), Start Date/Time (date and time of alarm occurrence), End Date/Time (date and time of alarm end), Alarm Code, Alarm Group (alarm group code), Product No. (product code), Schedule No. (schedule code), and Resin Type (resin code) in time sequence according to the occurrence state of alarm as shown in FIG. 9. Also, in the production result data storage file in the host computer 1 are stored the data of the items of Machine No. (machine number of injection molding machine), Start Date/Time (date and time of start of molding work), End Date/Time (date and time of end of molding work), Schedule No. (schedule code), Product No. (product code), and Resin Type (resin code) as shown in FIG. 10.

It is to be noted that the aforementioned processing regarding data collection can also be performed by a controller on the side of the injection molding machine.

Figure 11:
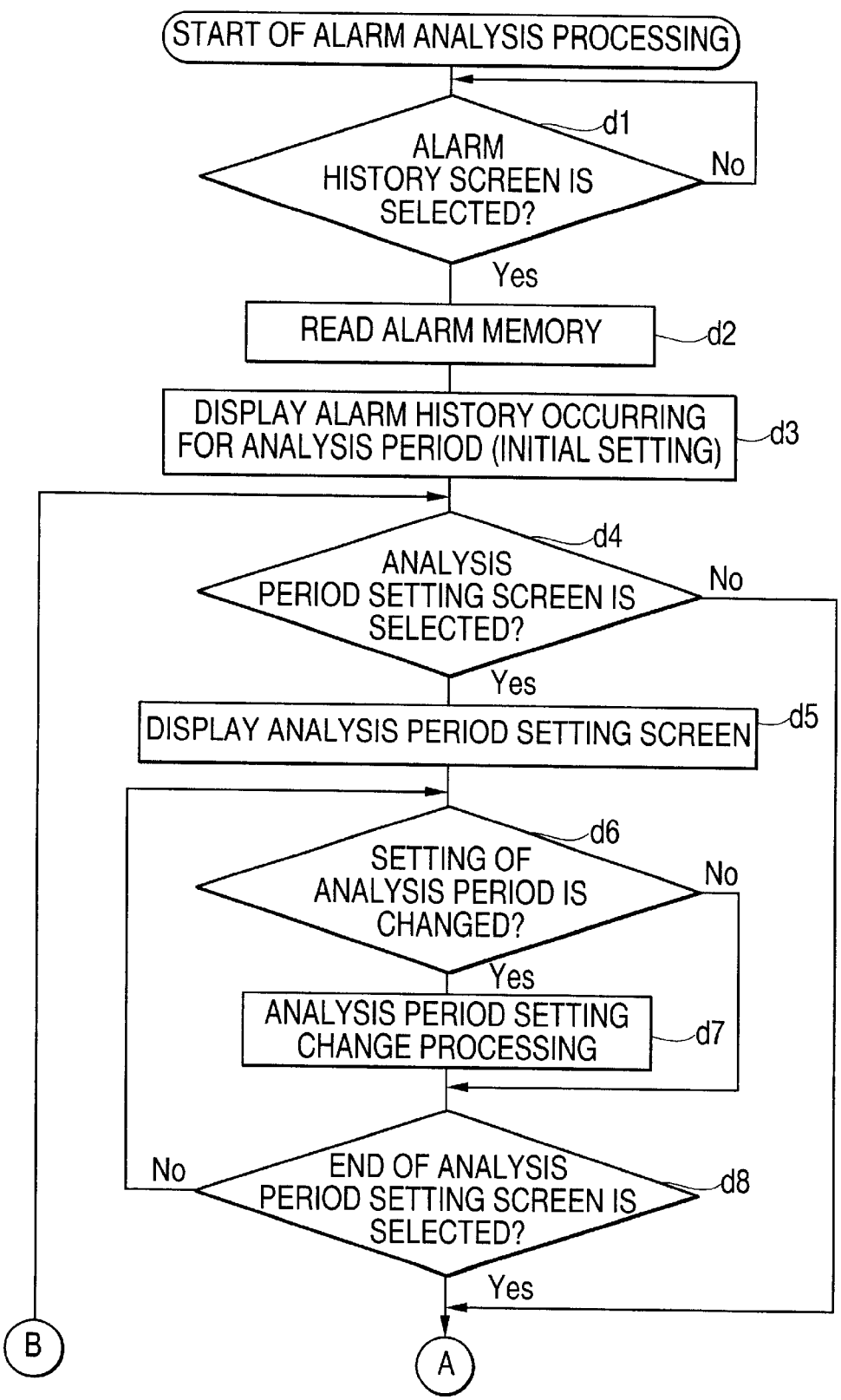
FIG. 11 is a flowchart showing the outline of alarm analysis processing executed by a host computer.
Figure 12:
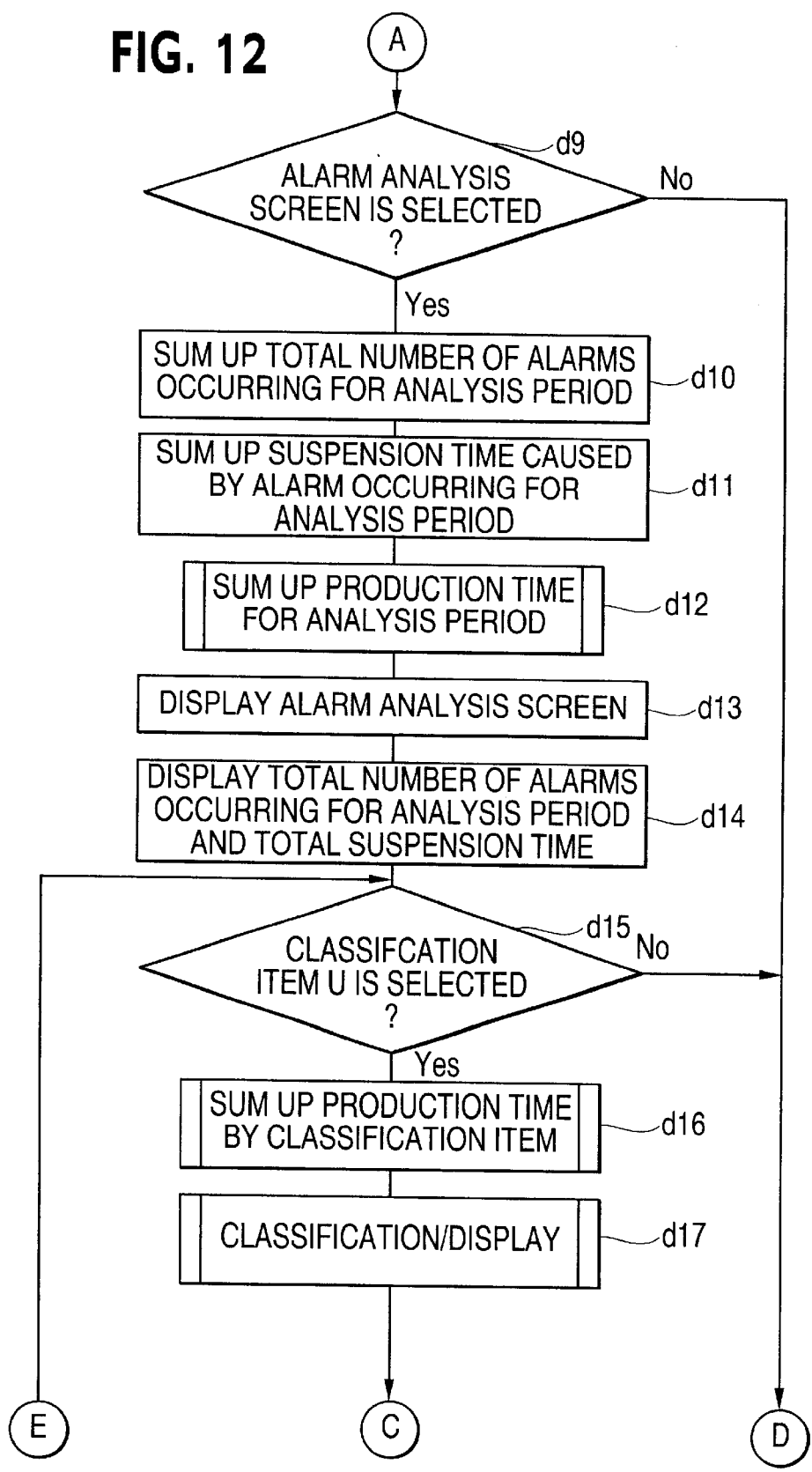
FIG. 12 is a continuance of flowchart showing the outline of alarm analysis processing.
Figure 13:
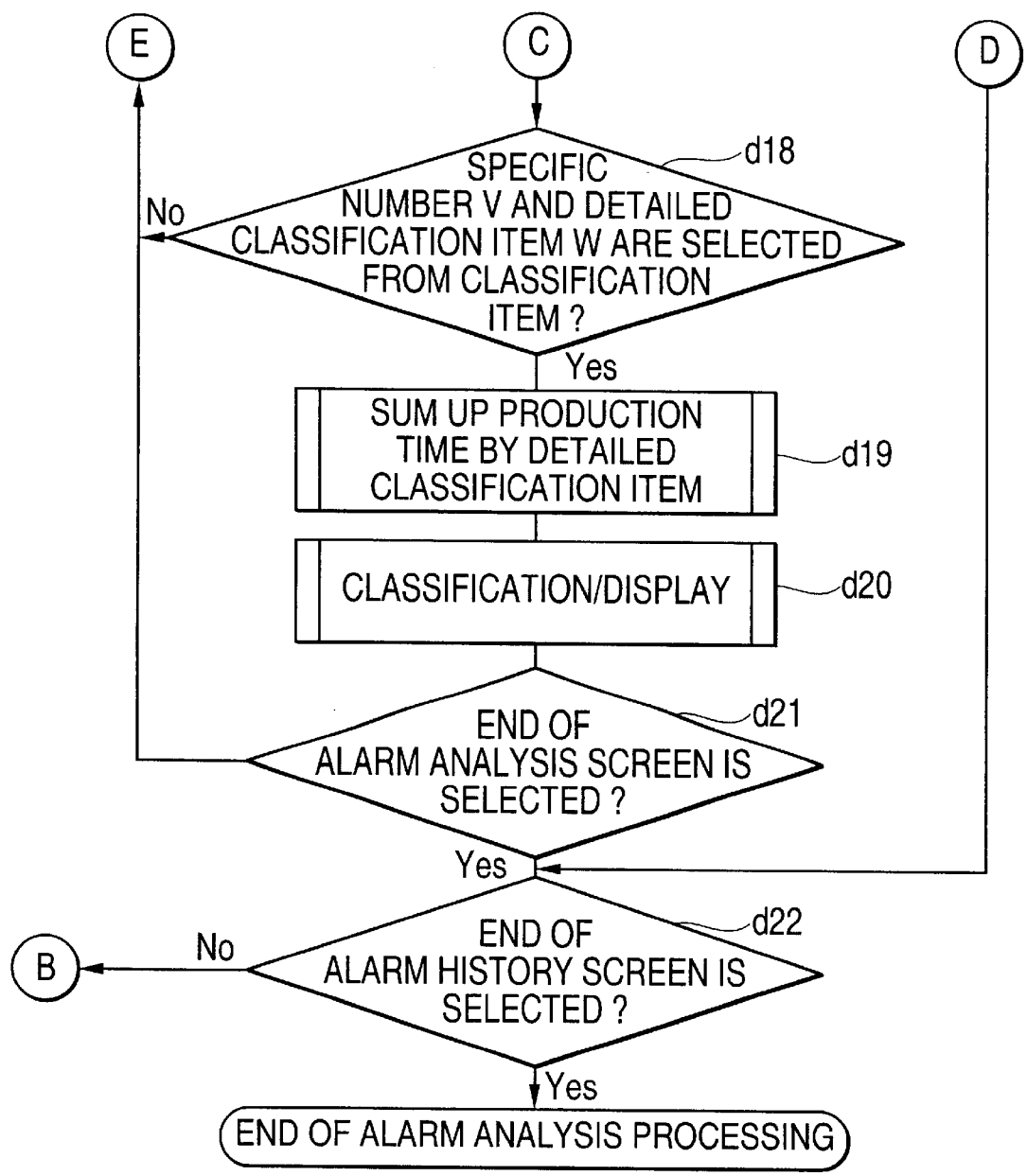
FIG. 13 is a continuance of flowchart showing the outline of alarm analysis processing.

Next, alarm analysis processing in this embodiment will be described with reference to the flowcharts shown in FIGS. 11 to 13, showing an example of the case where the alarm data storage file and the production result data storage file are provided on the side of the host computer 1. This processing is executed by inputting a selection command of alarm history screen to the host computer 1 by the operator's operation of a keyboard, mouse, or the like.

The host computer 1, which detected the selection of alarm history screen and started alarm analysis processing (Step d1), first reads the alarm data storage file shown in FIG. 9 (Step d2), and displays a list of history of alarms occurring for the analysis period set by default on an alarm history display screen as shown in FIG. 2 (Step d3). As shown in FIG. 2, only Start Date/Time (date and time of alarm occurrence) and Alarm Code are actually displayed. Of these, the portion of Alarm Code is converted into a text form which can be directly understood by the operator by referring to a reference file etc. which store Alarm Code and character strings so as to correspond to each other. For example, "3 servo system is in trouble" is displayed on the monitor screen. The default value of analysis period is displayed for the whole period, and the portion which cannot be displayed on the monitor screen is displayed by page up or page down by the operation of a scroll box.

Then, the host computer 1 enters a waiting state to wait the selection operation of analysis period setting screen (Step d4), the selection operation of alarm analysis screen (Step d9), or the selection operation of alarm history screen end (Step d22) by the operator.

The analysis period setting screen is a setting screen for inputting a period etc. for which alarm analysis is made, the alarm analysis screen is a screen for displaying the analysis results, and the alarm history screen end is a keyboard or mouse operation for ending the alarm analysis processing.

When setting or changing the period etc. for which alarm analysis is made, the operator first selects an analysis condition setting screen, and inputs the alarm analysis period etc. on that screen.

The host computer 1, which detected the selection operation of analysis condition setting screen by the judgment processing in Step d4, displays the analysis period setting screen (Step d5), and thereafter waits until the input operation of the alarm analysis period etc. is performed by the operator. If the input operation is performed by the operator, the host computer 1 judges whether the newly set alarm analysis period is equal to the default value stored at this time (Step d6). If the newly set alarm analysis period is equal to the default value stored at this time, the host computer 1 keeps the default value as it is, ignoring the input operation of this time. If the newly set alarm analysis period is different from the default value stored at this time, the host computer 1 updates and stores the newly set alarm analysis period (Step d7). The date and time when the alarm analysis period starts is stored as S, and the date and time when the alarm analysis period ends is stored as E.

FIG. 2 shows, as one example, the case where the period from Jan. 10, 1997, to Oct. 9, 1997, is set as the alarm analysis period.

The processing in Steps d6 to d8 is executed repeatedly until the end of the alarm analysis period setting screen is selected. Therefore, retrying work etc. for correcting a mistakenly input alarm analysis period are easy to perform. After setting a desired alarm analysis period, the operator selects the end of the analysis period setting screen, thereby exiting this routine (Step d8).

When the alarm data storage file etc. are analyzed and the analysis result is displayed, the operator selects the alarm analysis screen, selects desired statistical processing, and thereafter makes the host computer 1 perform automatic processing according to the aforementioned alarm analysis period S and E.

The host computer 1, which detected the selection of the alarm analysis screen in the processing in Step d9, first sums up the total number of alarm occurrences according to the stored alarm analysis period (Step d10).

Therefore, if, for example, the period from Feb. 5, 1997, to Aug. 4, 1997, is set as the alarm analysis period, the counting of the number of alarm occurrences is automatically limited to the period from Feb. 5, 1997, to Aug. 4, 1997. The processing in Step d10 is executed by searching the alarm data storage file shown in FIG. 9 and simply counting the number of items of Start Date/Time included in the period from start to end of the alarm analysis period.

Next, the host computer 1 sums up the suspension time of the injection molding machine caused by an alarm according to the stored alarm analysis period (Step d11). Like the aforementioned processing in Step 10, this processing is also performed by searching the alarm data storage file shown in FIG. 9 and simply summing up the suspension time of injection molding machine caused by an alarm. Specifically, this processing is performed by obtaining the suspension time caused by an alarm by subtracting the value of Start Date/Time from the value of End Date/Time of each record included in the period from start to end of the alarm analysis period, and by summing up the values for all records for the aforesaid period.

Although an analysis is made to obtain the number of alarm occurrences and the suspension time of injection molding machine caused by alarm occurrence, the situation differs between the short operating time (production time) of injection molding machine and the long operation time thereof. That is to say, even if the number of alarm occurrences and the suspension time of injection molding machine caused by alarm occurrence are equal, when the operating time of injection molding machine is long, the ratio of the number of alarm occurrences and the suspension time of injection molding machine caused by alarm occurrence is relatively low, and when the operation time of injection molding machine is short, the ratio of the number of alarm occurrences and the suspension time of injection molding machine caused by alarm occurrence is relatively high.

Naturally, the influence exerted on the molding work is stronger in the latter case, so that these situations must be distinguished clearly.

For this reason, in this embodiment, in order to accurately analyze the number of alarm occurrences and the suspension time of injection molding machine caused by alarm occurrence, the number of alarm occurrences and the suspension time of injection molding machine caused by alarm occurrence with respect to the operating time (production time) of injection molding machine are analyzed and displayed.

Figure 14:
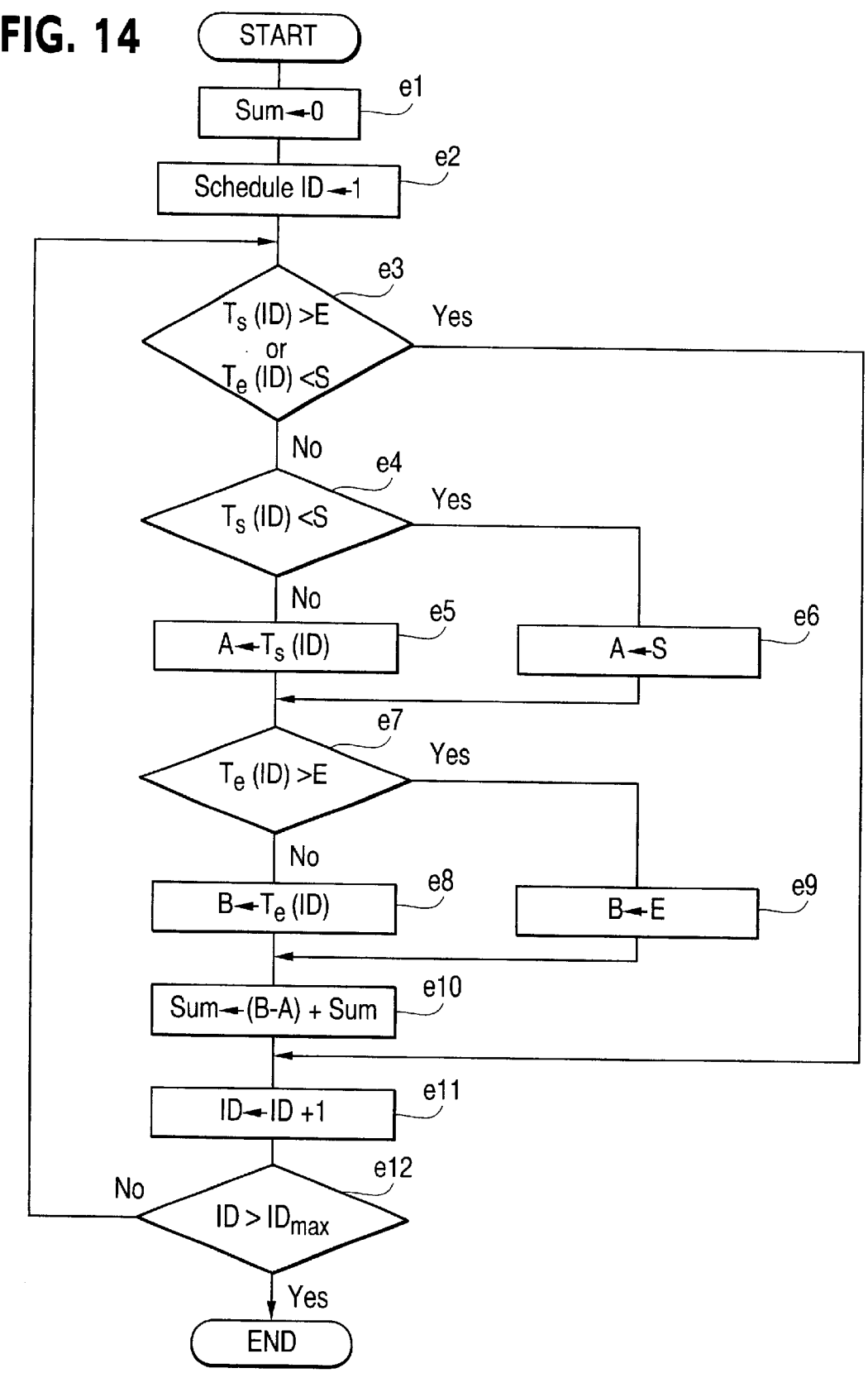
FIG. 14 is a flowchart showing the outline of processing for determining the total operating time of an injection molding machine for an analysis period.

First, processing (total operating time calculation processing) in Step 12 for obtaining the total operating time (total production time) of injection molding machine for the analysis period will be explained with reference to the flowchart shown in FIG. 14.

The host computer 1, which started the total operating time calculation processing, first initializes the value of a total operating time integrating register Sum to zero (Step e1), and sets an initial value 1 to a Schedule ID search index (Step e2).

Then, the host computer 1 accesses the production result data storage file shown in FIG. 10 to read a record in which the value of data address agrees with the present value of the Schedule ID search index, reads the value Ts (ID) of field of Start Date/Time (date and time of start of molding work) and the value Te (ID) of field of End Date/Time (date and time of end of molding work) of that record, and judges whether the date and time of start of molding work Ts (ID) is date and time after the end of alarm analysis period E in time sequence, and whether the date and time of end of molding work Te (ID) is date and time before the start of alarm analysis period S in time sequence (Step e3).

If the judgment result of Step e3 is Yes, that is, if the date and time of start of molding work Ts (ID) of that record is date and time after the end of alarm analysis period F in time sequence, or the date and time of end of molding work Te (ID) is date and time before the start of alarm analysis period S in time sequence, the result means that the data of that record are not included in the alarm analysis period, for example, in the period from Feb. 5, 1997, to Aug. 4, 1997 of the aforementioned example. Therefore, the host computer 1 skips Step e4 and the following steps and adds 1 to the value of the Schedule ID search index (Step e11).

If the judgment result of Step e3 is No, the result means that a part or the whole of the period of molding work of that record is included in the alarm analysis period. Therefore, the host computer 1 first determines the earliest date and time A of molding work of that record included in the alarm analysis period.

Specifically, a judgment is made as to whether the date and time of start of molding work Ts (ID) of that record is date and time before the start of alarm analysis period S in time sequence (Step e4). If the date and time of start of molding work Ts (ID) is date and time after the start of alarm analysis period S in time sequence, the date and time of start of molding work Ts (ID) is the earliest date and time A of molding work of that record (Step e5). If the date and time of start of molding work Ts (ID) is date and time before the start of alarm analysis period S in time sequence, the time before the date and time of start of alarm analysis period S is invalid, and the date and time of start of alarm analysis period S itself is the earliest date and time A of molding work of that record included in the alarm analysis period (Step e6).

Then, the host computer 1 determines the latest date and time B of molding work of that record included in the alarm analysis period.

Specifically, The host computer 1 judges whether the date and time of end of molding work Te (ID) of that record is date and time after the end of alarm analysis period E in time sequence (Sten e7). If the date and time of end of molding work Te (ID) of that record is date and time before the end of alarm analysis period E in time sequence, the date and time of end of molding work Te (ID) is the latest date and time B of molding work of that record (Step e8). If the date and time of end of molding work Te (ID) of that record is date and time after the end of alarm analysis period E in time sequence, the time after the date and time of end of alarm analysis period E is invalid, and the date and time of end of alarm analysis period E itself is the latest date and time B of molding work of that record included in the alarm analysis period (Step e9).

Next, the host computer 1 determines the molding work time of that record included in the alarm analysis period by subtracting the earliest date and time A of molding work of that record from the latest date and time B of molding work of that record, and adds this time to the total operating time integrating register Sum (Step e10).

Further, the host computer 1 adds 1 to the value of the Schedule ID search index (Step e11), and judges whether the present value of the Schedule ID search index exceeds the final value IDmax of data address of the production result data storage file (Step e12).

If the present value of the Schedule ID search index does not exceed the final value IDmax of data address, the judgment result means that there may be another record included in the alarm analysis period. Therefore, the host computer 1 proceeds again to the processing in Step e3, accesses the production result data storage file shown in FIG. 10 based on the value of the Schedule ID search index updated by the processing in Step e11, and reads the value Ts (ID) of Start Date/Time and the value Te (ID) of End Date/Time of the next data address, by which the same processing as described before is repeatedly executed.

Therefore, when the present value of the Schedule ID search index finally exceeds the final value IDmax of data address of the production result data storage file, and the judgment result of Step e12 becomes Yes, the molding work time of all injection molding machines included between the date and time of start of alarm analysis period S and the date and time of end of alarm analysis period E is stored in the total operating time integrating register Sum.

Figure 3:
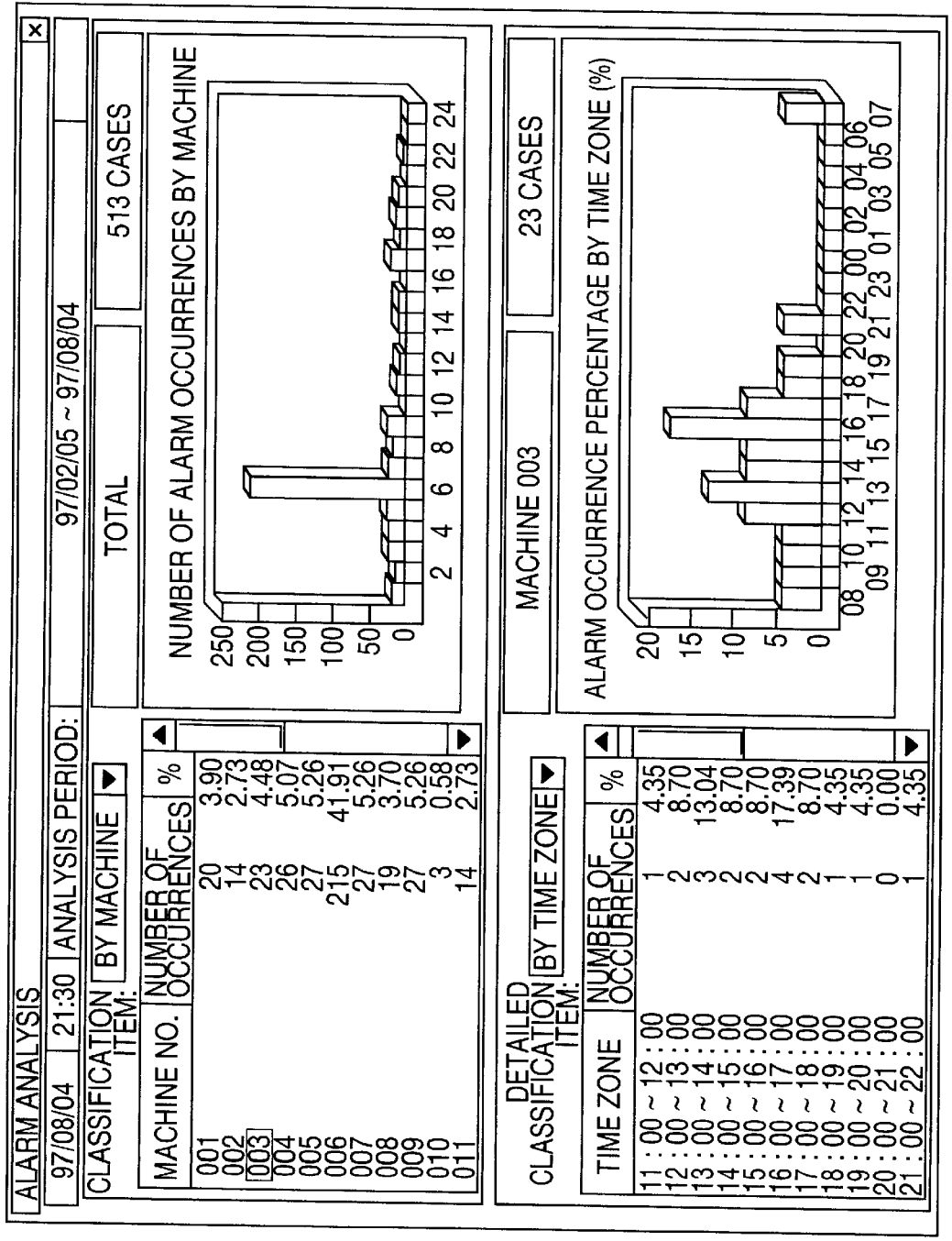
FIG. 3 is a view showing one example of an alarm analysis screen displayed on a host computer of this embodiment.

The host computer 1, which determined the total operating time (total production time) of injection molding machine for the alarm analysis period by the processing in Step d12, then displays an alarm analysis screen including classification items and detailed classification items as shown in FIG. 3 on the monitor (Step d13). Further, the host computer 1 displays the number of alarm occurrences for the analysis period summed up by the processing in Step d10 and the total suspension time of injection molding machine for the analysis period summed up by the processing in Step d11 in the column of TOTAL (Step d14), and enters a waiting state to wait for the operator to select an arbitrary classification item from the pull-down menu of classification items (Step d15).

The classification items include item by machine, by resin, by time zone, by schedule, by alarm, by alarm group, by product, and so on. This item classification is also applied to the detailed classification items.

When the operator selects a desired classification item, for example, item by machine from the pull-down menu of classification items, the host computer 1 detects this operation by judgment processing in Step d15, stores the selected classification item U, for example, item by machine, and starts the processing in Step d16 to individually obtain the operating time of injection molding machine for each element of classifcation item based on the selected classification item.

Figure 15:
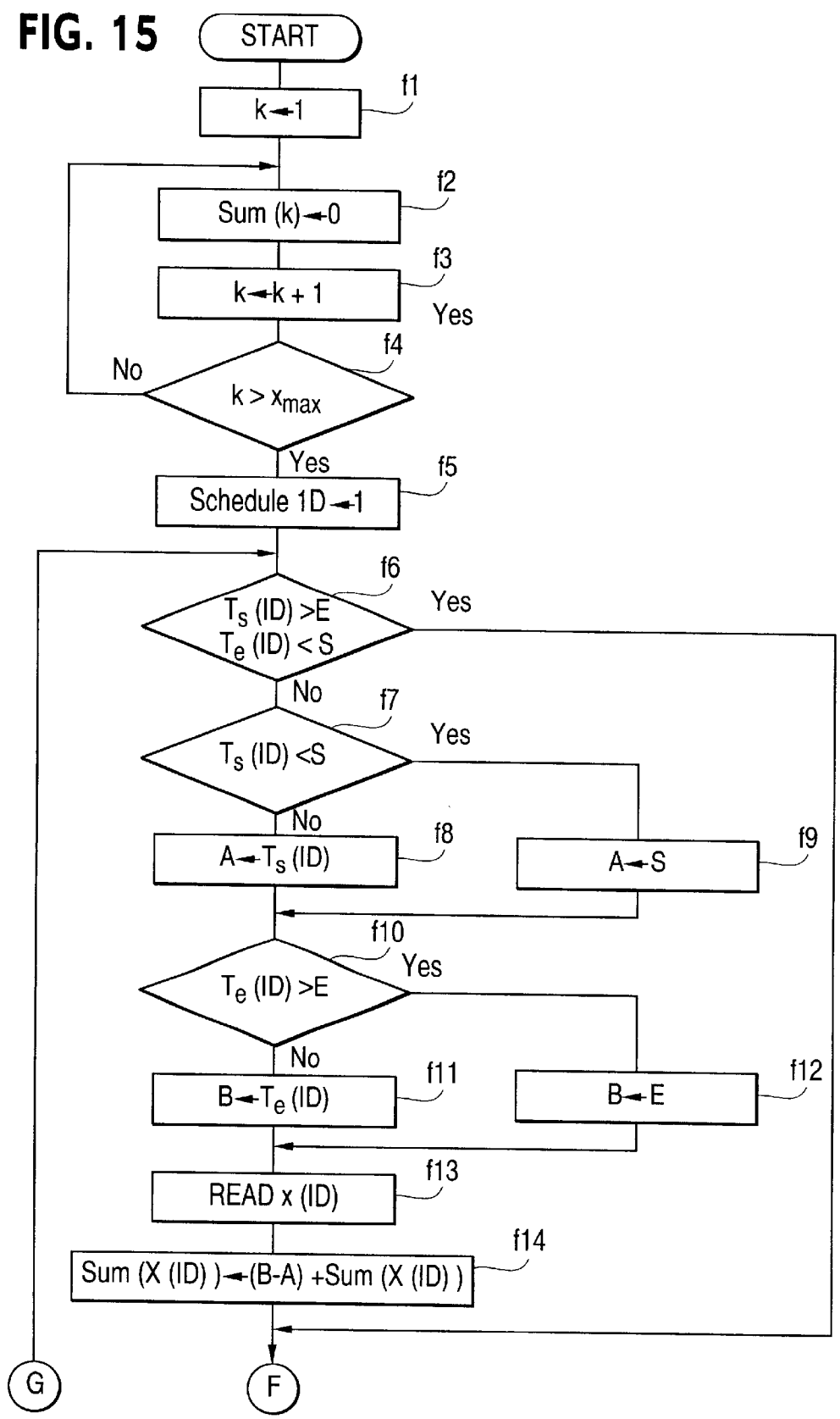
FIG. 15 is a flowchart showing the analysis processing based on the classification item.
Figure 16:
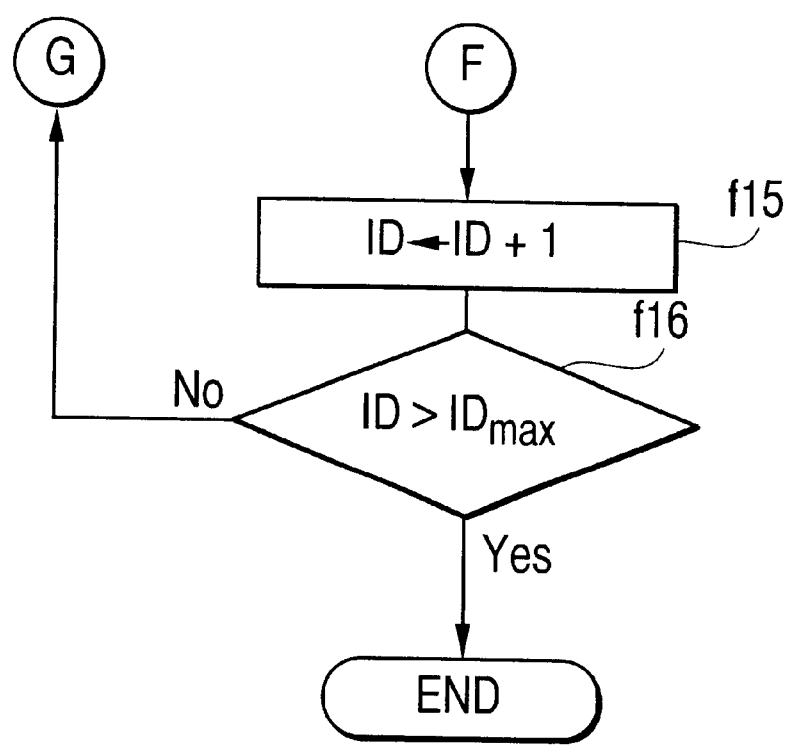
FIG. 16 is a continuance of flowchart showing the analysis processing based on a classification item.

Next, the processing (total operating time calculation processing by classification item element) in Step d16 to individually obtain the operating time of injection molding machine based on the classification item will be explained with reference to the flowcharts shown in FIGS. 15 and 16.

The host computer 1, which started the total operating time calculation processing by classification item element, first sets an initial value 1 to an element identification index k for identifying the element of classification item (Step f1). After initializing the value of a total operation time integrating register by classification item element Sum (k) corresponding to the index k to zero (Step f2), the host computer 1 adds 1 to the value of the index k (Step f3), and then judges whether the value of the index k exceeds the value of the number of elements Xmax of classification item (Step f4).

For example, if the selected classification item U is item by machine, the total operation time integrating register by classification item element Sum (k) is a register for storing the total operating time of each injection molding machine. The value of the number of elements Xmax in this case is the total number of injection molding machines connected to the host computer 1. If the selected classification item U is item by resin, the total operation time integrating register by classification item element Sum (k) is a register for storing the total time of injection molding work for each resin. The value of the number of elements Xmax in this case is the total number of types of various resins used for the injection molding work.

If the judgment result of Step f4 is No, the result means that there is another total operation time integrating register by classification item element Sum (k) to be initialized. Therefore, the host computer 1 proceeds again to the processing in Step f2, and repeatedly executes the processing to initialize the value of the total operation time integrating register by classification item element Sum (k) corresponding to the element identification index k updated by the processing in Step f3 to zero.

The same processing as described above is repeatedly executed until the judgment result of Step f4 becomes Yes. Finally, when the judgment result of Step f4 becomes Yes, the values of all total operation time integrating registers by classification item element Sum (k) corresponding to each of elements forming the classification item U, that is, total operation time integrating registers by classification item element Sum (k) of k=1 to Xmax are initialized to zero.

Then, the host computer 1 sets an initial value 1 to the Schedule ID search index (Step f5), accesses the production result data storage file shown in FIG. 10 to read a record in which the value of data address agrees with the present value of the Schedule ID search index, reads the value Ts (ID) of field of Start Date/Time (date and time of start of molding work) and the value Te (ID) of field of End Date/Time (date and time of end of molding work) of that record, and judges whether the date and time of start of molding work Ts (ID) is date and time after the end of alarm analysis period E in time sequence, and whether the date and time of end of molding work Te (ID) is date and time before the start of alarm analysis period S in time sequence (Step f6).

If the judgment result of Step f6 is Yes, that is, if the date and time of start of molding work Ts (ID) of that record is date and time after the end of alarm analysis period E in time sequence, or the date and time of end of molding work Te (ID) is date and time before the start of the alarm analysis period S in time sequence, the result means that the data of that record are not included in the alarm analysis period, for example, in the period from Feb. 5, 1997, to Aug. 4, 1997 of the aforementioned example. Therefore, the host computer 1 skips Step f7 and the following steps and adds 1 to the value of the Schedule ID search index (Step f15).

If the judgment result of Step f6 is No, the result means that a part or the whole of the period of molding work of that record is included in the alarm analysis period. Therefore, the host computer 1 first determines the earliest date and time A of molding work of that record included in the alarm analysis period.

Specifically, a judgment is made as to whether the date and time of start of molding work Ts (ID) of that record is date and time before the start of alarm analysis period S in time sequence (Step f7). If the date and time of start of molding work Ts (ID) is date and time after the start of alarm analysis period S in time sequence, the date and time of start of molding work Ts (ID) is the earliest date and time A of molding work of that record (Step f8). If the date and time of start of molding work Ts (ID) is date and time before the start of alarm analysis period S in time sequence, the time before the date and time of start of alarm analysis period S is invalid, and the date and time of start of alarm analysis period S itself is the earliest date and time A of molding work of that record included in the alarm analysis period (Step f9).

Then, the host computer 1 determines the latest date and time B of molding work of that record included in the alarm analysis period.

Specifically, the host computer 1 judges whether the date and time of end of molding work Te (ID) of that record is date and time after the end of alarm analysis period E in time sequence (Step f10). If the date and time of end of molding work Te (ID) of that record is date and time before the end of alarm analysis period F in time sequence the date and time of end of molding work Te (ID) is the latest date and time B of molding work of that record (Step f11). If the date and time of end of molding work Te (ID) of that record is date and time after the end of alarm analysis period E in time sequence, the time after the date and time of end of alarm analysis period E is invalid, and the date and time of end of alarm analysis period E itself is the latest date and time B of molding work of that record included in the alarm analysis period (Step f12).

Then, the host computer 1 reads a classification item element X (ID) stored in the column of the classification item U of a record which is accessed by the host computer 1 at the present stage in the production result data storage file shown in FIG. 10 to identify the element of classification item (Step f13). Thereafter, the host computer 1 reads the value of the total operation time integrating register by classification item element Sum (X(ID)) corresponding to this element among a large number of total operation time integrating registers by classification item element Sum (k), determines the molding work time of that record included in the alarm analysis period by subtracting the earliest date and time A of molding work of the aforesaid record from the latest date and time B of molding work of that record, adds this time to the total operation time integrating register Sum (X(ID)), and updates and stores the obtained value as the value of the total operation time integrating register Sum (X(ID)) (Step f14).

For example, if the selected classification item U is item by machine, and the host computer 1 accesses the record of data address 4 in accordance with the value of Schedule ID=4, in the case of the example shown in FIG. 10, the value of field of the classification item U in the record of data address 4, that is, the value in the column of item by machine is Machine No. 2. In this example, therefore, the aforesaid value of B-A is added to the total operation time integrating register by machine Sum (X(ID)), in effect, the total operating time integrating register Sum (2). That is to say, in the case where the classification item U is item by machine, the total operating time of each Machine No. of injection molding machine, which is the element, is determined individually.

Then,, the host computer 1 adds 1 to the value of the Schedule ID search index (Step f15), and judges whether the present value of the Schedule ID search index exceeds the final value IDmax of data address of the production result data storage file (Step f16).

If the present value of the Schedule ID search index does not exceed the final value IDmax of data address, the judgment result means that there may be another record included in the alarm analysis period. Therefore, the host computer 1 proceeds again to the processing in Step f6, accesses the production result data storage file shown in FIG. 10 based on the value of the Schedule ID search index updated by the processing in Step f15, and reads the value Ts (ID) of Start Date/Time and the value Te (ID) of End Date/Time of field of the next data address, by which the same processing as described before is repeatedly executed.

Therefore, when the present value of the Schedule ID search index finally exceeds the final value IDmax of data address of the production result data storage file, and the judgment result of Step f16 becomes Yes, the molding work time of all injection molding machines included between the date and time of start of alarm analysis period S and the date and time of end of alarm analysis period E is stored in the total operation time integrating register by classification item element Sum (X(ID)) for each element of classification item U assigned by the operator in the process in Step d15.

The host computer 1, which finished the process in Step d16, then starts the processing (classification item analysis display processing) in Step d17 for determining and displaying the number of alarm occurrences for each element of classification item U for the alarm analysis period, the alarm suspension time for each element of classification item U for the alarm analysis period, the ratio of the number of alarm occurrence to the total operating time for each element of classification item U for the alarm analysis period, and the ratio of the alarm suspension time to the total operating time for each element of classification item U for the alarm analysis period.

Figure 17:
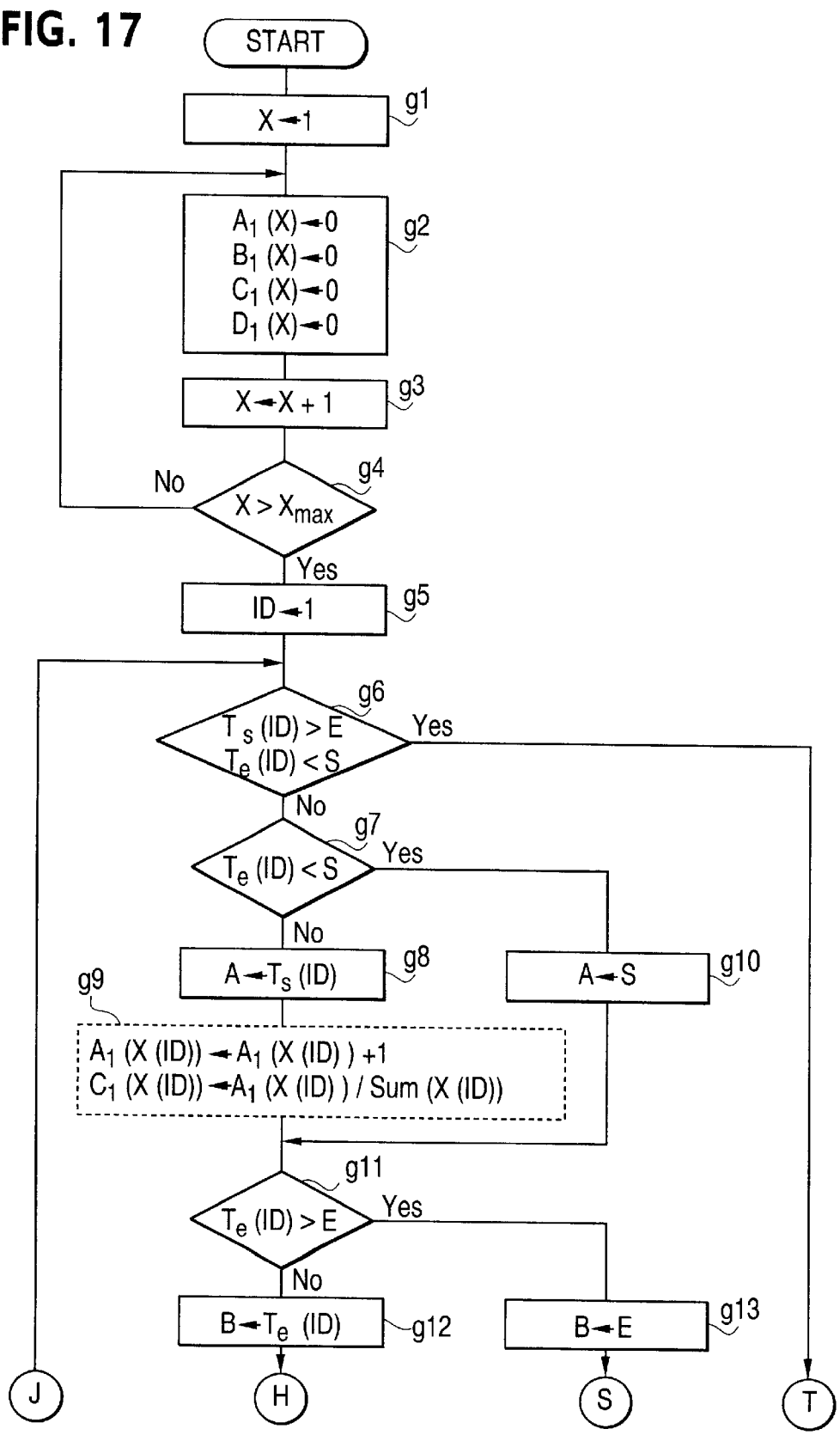
FIG. 17 is a flowchart showing the outline of classification item analysis display processing.
Figure 18:
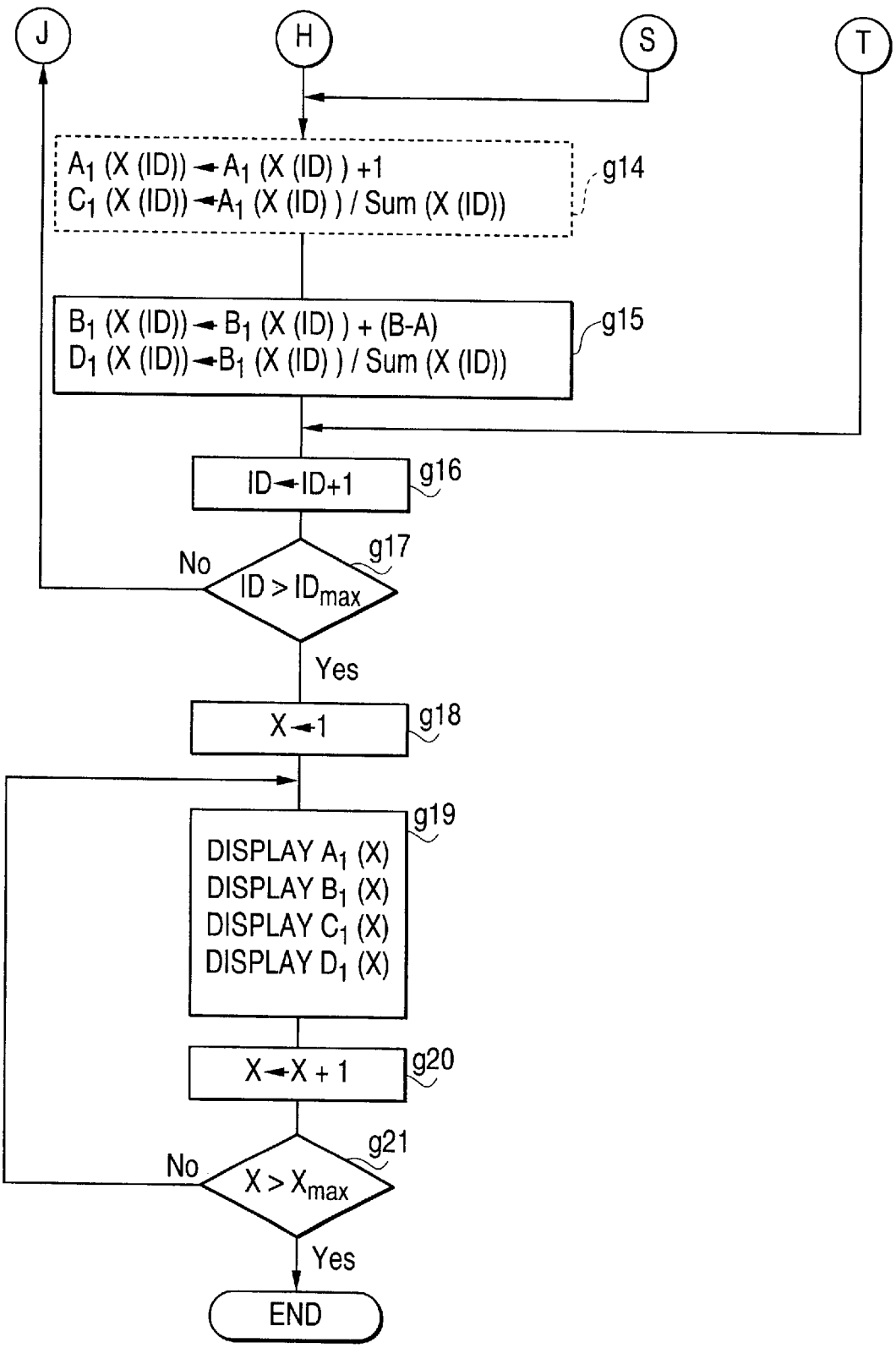
FIG. 18 is a continuance of flowchart showing the outline of classification item analysis display processing.

The classification item analysis display processing will be explained below with reference to the flowcharts shown in FIGS. 17 and 18.

The host computer 1, which started the classification item analysis display processing, first sets an initial value 1 to the element identification index X for identifying the element of classification item (Step g1), and initializes each value of an alarm occurrence number storage register by classification item element A1(X), an alarm suspension time storage register by classification item element B1(X), an alarm occurrence number ratio storage register by classification item element C1(X), and an alarm suspension time ratio storage register by classification item element D1(X) corresponding to the index X to zero (Step g2). Thereafter, the host computer 1 adds 1 to the value of the index X (Step g3), and then judges whether the value of the index X exceeds the value of the number of elements Xmax of classification item (Step g4).

For example, if the selected classification item U is item by machine, the alarm occurrence number storage register by classification item element A1(X) is a register for summing up and storing the number of alarm occurrences for each injection molding machine, and the alarm suspension time storage register by classification item element B1(X) is a register for summing up and storing the alarm suspension time for each injection molding machine. Also, the alarm occurrence number ratio storage register by classification item element C1(X) is a register for storing the ratio of the number of alarm occurrences to the total operating time for each injection molding machine, and the alarm suspension time ratio storage register by classification item element D1(X) is a register for storing the ratio of the alarm occurrence time to the total operating time for each injection molding machine. The total number Xmax of each register agrees with the total number of injection molding machines connected to the host computer 1.

If the judgment result of Step g4 is No, the result means that there are other various registers to be initialized. Therefore, the host computer 1 proceeds again to the processing in Step g2, and repeatedly executes the processing to initialize the values of various registers corresponding to the element identification index X updated by the processing in Step g3 to zero.

The same processing as described above is repeatedly executed until the judgment result of Step g4 becomes Yes. Finally, when the judgment result of Step g4 becomes Yes, the values of all of the alarm occurrence number storage register by classification item element A1(X), the alarm suspension time storage register by classification item element B1(X), the alarm occurrence number ratio storage register by classification item element C1(X), and the alarm suspension time ratio storage register by classification item element D1(X) corresponding to each of elements forming the classification item U, that is, all registers of k=1 to Xmax are initialized to zero.

Then, the host computer 1 sets an initial value 1 of address to the alarm ID search index (Step g5), accesses a record corresponding to the present value of alarm ID search index in the alarm data storage file shown in FIG. 9, reads the value Ts (ID) of field of Start Date/Time (date and time of alarm occurrence) and the value Te (ID) of field of End Date/Time (date and time of alarm end) of that record, and judges whether the date and time of alarm occurrence Ts (ID) is date and time after the end of alarm analysis period E in time sequence, and whether the date and time of alarm end Te (ID) is date and time before the start of alarm analysis period S in time sequence (Step g6).

If the judgment result of Step g6 is Yes, that is, if the date and time of alarm occurrence Ts (ID) of that record is date and time after the end of alarm analysis period E in time sequence, or the date and time of alarm end Te (ID) is date and time before the start of alarm analysis period S in time sequence, the result means that the data of that record are not included in the alarm analysis period, for example, the period from Feb. 5, 1997, to Aug. 4, 1997 of the aforementioned example. Therefore, the host computer 1 skips Step g7 and the following steps and adds 1 to the value of the alarm ID search index (Step g16).

If the judgment result of Step g6 is No, the result means that a part or the whole of the period of alarm occurrence of that record is included in the alarm analysis period. Therefore, the host computer 1 first determines the earliest date and time A of alarm period of that record included in the alarm analysis period.

Specifically, a judgment is made as to whether the date and time of alarm occurrence Ts (ID) of that record is date and time before the start of alarm analysis period S in time sequence (Step g7). If the date and time of alarm occurrence Ts (ID) is date and time after the start of alarm analysis period S in time sequence, the date and time of alarm occurrence Ts (ID) is the earliest date and time A of alarm period of that record (Step g8). If the date and time of alarm occurrence Ts (ID) is date and time before the start of alarm analysis period S in time sequence, the time before the date and time of start of alarm analysis period S is invalid, and the date and time of start of alarm analysis period S itself is the earliest date and time A of alarm period of that record included in the alarm analysis period (Step g10).

Further, if the date and time of alarm occurrence Ts (ID) becomes date and time after the start of alarm analysis period S in time sequence, that is, if the judgment result of Step g7 is No, the result means that an alarm occurred for the alarm analysis period. Therefore, in order to count this alarm as the alarm occurring for the alarm analysis period, the host computer 1 reads a classification item element X (ID) stored in the column of the classification item U of a record which is accessed by the host computer 1 at the present stage in the alarm data storage file shown in FIG. 9 to identify the element of classification item. Thereafter, the host computer 1 reads the value of the alarm occurrence number storage register by classification item element A1(X(ID)) corresponding to this element among a large number of alarm occurrence number storage registers by classification item element A1(X), adds 1 to the register A1(X(ID)), and updates and stores the value in the alarm occurrence number storage register by classification item element A1(X(ID)). Also, the host computer 1 determines the ratio of the number of alarm occurrence to the total operating time of the element by dividing the value of the alarm occurrence number storage register by classification item element A1(X (ID)) by the value of the total operating time integrating register Sum (X(ID)) corresponding to this element determined by the processing in Step d16 (Step f14 in FIG. 17), and stores the determined value in the alarm occurrence number ratio storage register by classification item element C1(X(ID) (STEP g9).

The processing in Step g9 is processing which is selectively executed when the date and time of alarm occurrence (momentary date and time of alarm occurrence) for the alarm analysis period counts only a certain alarm, and is not executed when all alarms overlapping with the alarm analysis period are counted regardless of where the date and time of alarm occurrence lies. If all alarms overlapping with the alarm analysis period are counted regardless of where the date and time of alarm occurrence lies, the processing in Step g14, described later, is executed in place of the processing in Step g9.

Then, the host computer 1 determines the latest date and time B of alarm period of that record included in the alarm analysis period.

Specifically, the host computer 1 judges whether the date and time of alarm end Te (ID) of that record is date and time after the end of alarm analysis period E in time sequence (Step g11). If the date and time of alarm end Te (ED) is date and time before the end of alarm analysis period E in time sequence, the date and time of alarm end Te (ID) is the latest date and time B of alarm period of that record (Step g12). If the date and time of alarm end Te (ID) of that record is date and time after the end of alarm analysis period E in time sequence, the time after the date and time of end of alarm analysis period E is invalid, and the date and time of end of alarm analysis period E itself is the latest date and time B of alarm period of that record included in the alarm analysis period (Step g13).

As described above, If all alarms overlapping with the alarm analysis period are counted regardless of where the date and time of alarm occurrence lies, the processing in Step g14 is executed in place of the processing in Step g9. In this case, all alarms in which a part or the whole of the period of alarm occurrence is included in the alarm analysis period are added to the corresponding alarm occurrence number storage register by classification item element A1(X (ID)), and the ratio C1(X(ID)) of the number of alarm occurrences to the total operating time of the element is determined (Step g14).

Then, the host computer 1 reads a classification item element X (ID) stored in the column of the classification item U of a record which is accessed by the host computer 1 at the present stage in the alarm data storage file shown in FIG. 9 to identify the element of classification item, determines the suspension time of molding work caused by alarm occurrence by subtracting the earliest date and time A of alarm period from the latest date and time B of alarm period, reads the value of the alarm suspension time storage register by classification item element B1(X(ID)) corresponding to this element among a large number of alarm suspension time storage registers by classification item element B1(X) as described above, adds the suspension time (B-A) of molding work to the value of the register B1(X(ID)), and updates and stores the value in the alarm suspension time storage register by classification item element B1(X(ID)). Also, the host computer 1 determines the ratio of the alarm suspension time to the total operating time of the element by dividing the value of the alarm suspension time storage register by classification item element B1(X(ID)) by the value of the total operating time integrating register Sum (X(ID)) corresponding to this element determined by the process in Step d16, and stores the determined value in the alarm suspension time ratio storage register by classification item element D1(X(ID)) (Step g15).

For example, if the classification item U selected in the process in Step d15 is item by machine, and the host computer 1 accesses the record of address of alarm ID=5 in accordance with the value 5 of alarm ID search index, in the case of the example shown in FIG. 9, the value of field of the classification item U in the record of alarm ID=5, that is, the value of column by machine is Machine No. 2. In this example, therefore, in the processing in Step g9 or Step g14, the value of the alarm occurrence number storage register by classification item element A1(X(ID)), in effect, the alarm occurrence number storage register by classification item element A1(2) is counted up by 1. Also, the ratio of the number of alarm occurrences to the total operating time of injection molding machine of Machine No. 2 is stored in the alarm occurrence number ratio storage register by classification item element C1(2). Also, in the processing in Step g15, the suspension time (B-A) is added to the alarm suspension time storage register by classification item element B1(2), and the ratio of the alarm suspension time to the total operating time of injection machine of Machine No. 2 is stored in the alarm suspension time ratio storage register by classification item element D1(2).

Then, the host computer 1 adds 1 to the value of the alarm ID search index (Step g16), and judges whether the present value of the index exceeds the final value IDmax of address (Step g17).

If the present value of the alarm ID search index does not exceed the final value Idmax, the judgment result means that there is another record included in the alarm analysis period. Therefore, the host computer 1 proceeds again to the processing in Step g6, accesses the alarm data storage file shown in FIG. 9 based on the value of the alarm ID search index updated by the processing in Step g16, and reads each data of field corresponding to the next alarm ID, by which the same processing as described before is repeatedly executed.

Therefore, finally, when the present value of the alarm ID search index exceeds the final value IDmax of alarm ID and the judgment result of Step g17 becomes Yes, the number of alarm occurrences A1(X) of each element X=1 to Xmax of classification item U for the alarm analysis period, the alarm suspension time B1(X) of each element X=1 to Xmax, the ratio C1(X) of the number of alarm occurrences to the total operating time of each element X=1 to Xmax, and the ratio D1(X) of the alarm suspension time to the total operating time of each element X=1 to Xmax are determined.

Specifically in the aforementioned example in which the classification item U is item by machine, the number of alarm occurrences A1(1) to A1(Xmax), the alarm suspension time B1(1) to B1(Xmax), the ratio C1(1) to C1(Xmax) of the number of alarm occurrences, the ratio D1(1) to D1(Xmax) of the alarm suspension time of alarms occurring on each of injection molding machines from Machine No. 1 to Machine No. Xmax for the period from Feb. 5, 1997, to Aug. 4, 1997 are all determined.

Next, the host computer 1 initializes the value of the element identification index X to 1 (Step g18), displays each value of the number of alarm occurrences A1(X), the alarm suspension time B1(X), the ratio C1(X) of the number of alarm occurrences, and the ratio D1(X) of the alarm suspension time as the analysis result so as to correspond to element X of the classification item on the upper half of the alarm analysis screen as shown in FIG. 3, and at the same time, displays the situation by a bar graph (Step g19).

Then, the host computer 1 adds 1 to the value of the element identification index X (Step g20), and judges whether the present value of the index X exceeds the final value Xmax of the number of elements (Step g21). If the present value of the index X does not exceed the final value Xmax, the judgment result means that there is another element for which the analysis result is to be displayed. Therefore, the host computer 1 proceeds again to the processing in Step g19, repeatedly executes the same processing as described before based on the value of the index X updated by the processing in Step g20, and repeatedly displays the analysis result of each item of the number of alarm occurrences A1(X), the alarm suspension time B1(X), the ratio C1(X) of the number of alarm occurrences, and the ratio D1(X) of the alarm suspension time regarding the next element by numerical display and bar graph.

When the judgment result of Step g21 finally becomes Yes, the display of each value of the number of alarm occurrences A1(1) to A1(Xmax), the alarm suspension time B1(1) to B1(Xmax), the ratio C1(1) to C1(Xmax) of the number of alarm occurrences, the ratio D1(1) to D1(Xmax) of the alarm suspension time corresponding to each of the elements 1 to Xmax is completed.

FIG. 3 shows, as an example, a monitor screen on which the alarm analysis period is limited to a period from Feb. 5, 1997, to Aug. 4, 1997, and the item by machine is selected as the classification item. In the field of the left end of the numerical display column shown on the upper left half of the alarm analysis screen, Machine No. X (in effect, the value of the index X) is displayed. The number of alarm occurrences A1(X) regarding Machine No. X and the ratio D1(X) of the alarm suspension time to the total operating time of Machine No. X are displayed horizontally so as to correspond to Machine No. X. Also, in the graph display column shown on the upper right half of the alarm analysis screen, the number of alarm occurrences A1(X) corresponding to each Machine No. X is displayed in the ordinate direction by choosing Machine No. X as the abscissa by a bar graph.

The host computer 1, which thus finished the classification item analysis display processing, waits until a specific element is selected from the elements included in the classification item U by the operator (Step d18), or until another classification item U is again selected (Step d15).

When another classification item U is selected again, the host computer 1 repeatedly executes the processing in Steps d16 and d17 as described before, determines each value of the number of alarm occurrences A1(1) to A1(Xmax), the alarm suspension time B1(1) to B1(Xmax), the ratio C1(1) to C1(Xmax) of the number of alarm occurrences, the ratio D1(1) to D1(Xmax) of the alarm suspension time corresponding to each element X=1 to Xmax constituting the item in accordance with the assignment of, for example, item by resin, and re-displays the values on the upper half of the alarm analysis screen.

This means that any other classification item is selected freely as necessary and the number of alarm occurrences, the ratio of the number of alarm occurrences, and so on can be re-displayed.

On the other hand, when a specific element is selected from the elements included in the classification item U by the operator, the host computer 1 stores the number V of the selected specific element in a register, and further waits until a detailed classification item W is selected from the pull-down menu (Step d18).

FIG. 3 shows the case where the operator selects the injection molding machine of Machine No. 3 (=V) from Machine No., which is the element of the classification item U, in the state in which item by machine is selected as the classification item U, and further selects item by time zone (=W) from the pull-down menu of detailed classification items.

The host computer 1, which detected the selection of detailed classification item W by the judgment processing in Step d18, starts the processing in Step d19 to individually determine the operating time of injection molding machine for each element of detailed classification item W based on the specific element V selected from the classification item U and the detailed classification item W.

Figure 19:
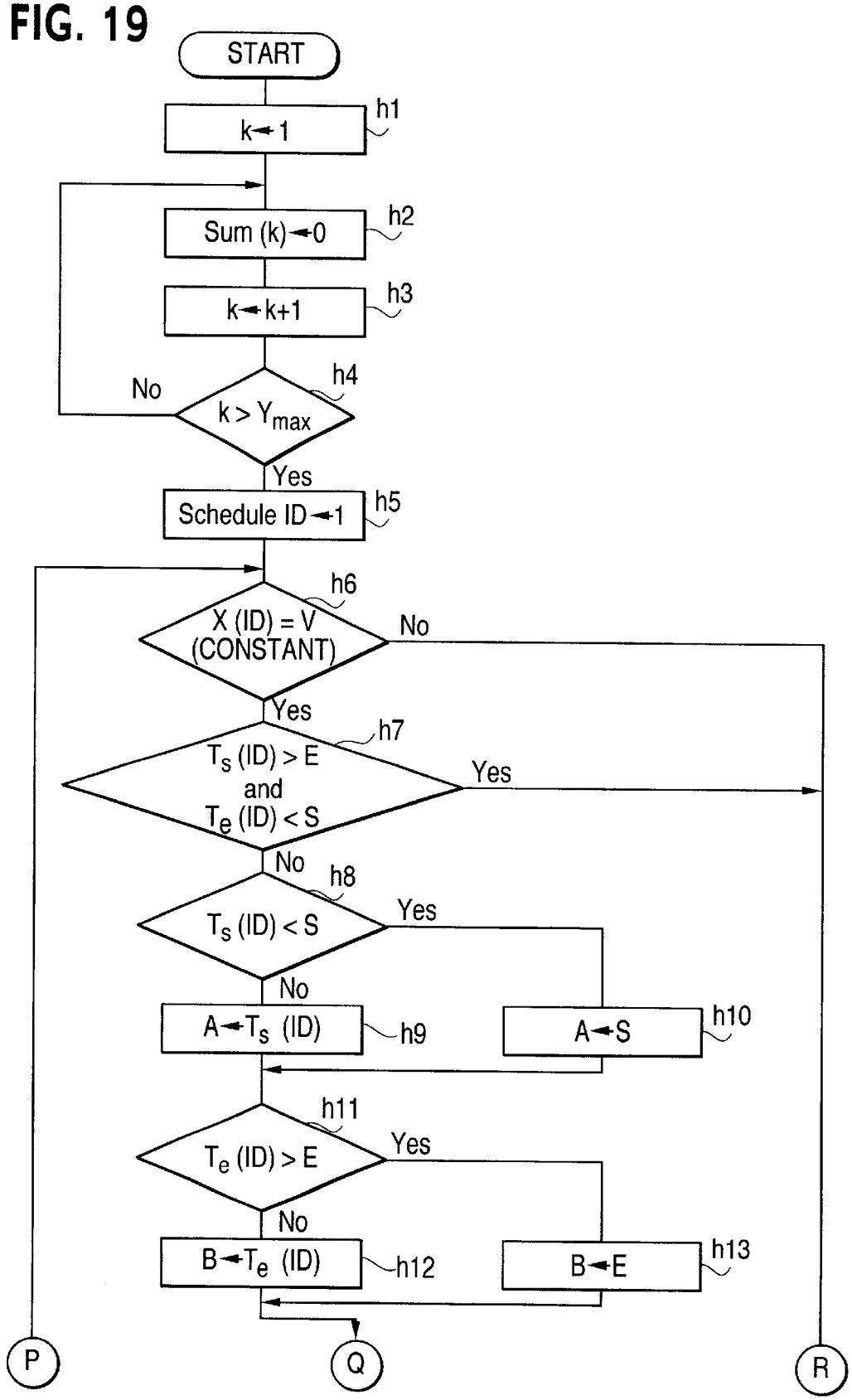
FIG. 19 is a flowchart showing the outline of analysis processing based on a detailed classification item.
Figure 20:
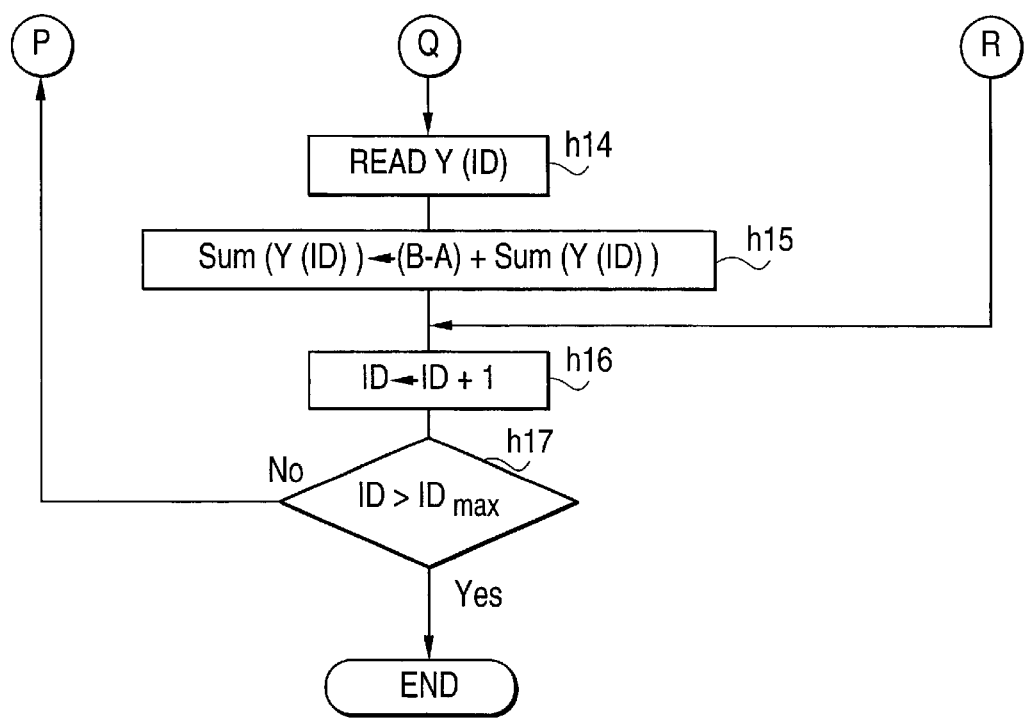
FIG. 20 is a continuance of flowchart showing the outline of analysis processing based on a detailed classification item.

Next, the processing (the total operating time calculation processing by detailed classification item element) in Step d19 for individually determining the operating time of injection molding machine based on the detailed classification item will be described with reference to the flowcharts shown in FIGS. 19 and 20.

The host computer 1, which started the total operating time calculation processing by detailed classification item element, first sets an initial value 1 to an element identification index k for identifying the element of detailed classification item (Step h1), initializes the value of a total operating time integrating register by detailed classification item element Sum (k) corresponding the index k to zero (Step h2), adds 1 to the value of the index k (Step h3), and judges whether the value of the index k exceeds the value of the number of elements Ymax of detailed classification item (Step h4).

For example, if the selected detailed classification item W is item by time zone, the total operating time integrating register by detailed classification item element Sum (k) is a register for storing the total operating time of only the injection molding work performed in a specific time zone identified by the value of k of the injection molding work belonging to the injection molding machine of, for example, Machine No. 3, which is the specific element V selected from the classification item U. For example, if the interval of time zone is one hour, the value of the number of elements Ymax is 24. Also, if the selected detailed classification item W is item by resin, the total operating time integrating register by detailed classification item element Sum (k) is a register for storing the total time of the injection molding work regarding the specific resin identified by the value of k of the injection molding work belonging to the injection molding machine of, for example, Machine No. 3, which is the specific element V selected from the classification item U. In this case, the value of the number of elements Ymax is the total number of types of various resins used for the injection molding machine.

If the judgment result of Step h4 is No, the result means that there is another total operating time integrating register by detailed classification item element Sum (k) to be initialized. Therefore, the host computer 1 proceeds again to the processing in Step h2, and repeatedly executes the processing for initializing the value of the total operating time integrating register by detailed classification item element Sum (k) corresponding to the element identification index k updated by the processing in Step h3.

The same processing as described above is repeatedly executed until the judgment result of Step h4 becomes Yes. Finally, when the judgment result of Step h4 becomes Yes, the values of all total operating time integrating registers by detailed classification item element Sum (k) corresponding to each of elements forming the detailed classification item W, that is, the total operating time integrating registers by detailed classification item element Sum (k) of k=1 to Ymax are initialized to zero.

Then, the host computer 1 sets an initial value 1 to the Schedule ID search index (Step h5), accesses the production result data storage file shown in FIG. 10 to read a record in which the value of data address agrees with the present value of the Schedule ID search index, reads the classification item element X (ID) stored in the column of classification item U of that record, and judges whether the specific element V selected from the classification item U by the processing in Step d18 agrees with the aforesaid X (ID) (Step b6).

If the selected specific element V does not agree with X (ID), the judgment result means that the data stored in this record has no relation with the injection molding work using the injection molding machine of, for example, Machine No. 3, which is the selected specific element V. Therefore, the host computer 1 skips Step h7 and the following steps and adds 1 to the value of the Schedule ID search index (Step h16).

If the selected specific element V agrees with X (ID), the host computer 1 further reads the value Ts (ID) of field of Start Date/Time (date and time of start of molding work) and the value Te (ID) of field of End Date/Time (date and time of end of molding work) of that record, and judges whether the date and time of start of molding work Ts (ID) is date and time after the end of alarm analysis period E in time sequence, and whether the date and time of end of molding work Te (ID) is date and time before the start of alarm analysis period S in time sequence (Step h7).

If the judgment result of Step h7 is Yes, that is, if the date and time of start of molding work Ts (ID) of that record is date and time after the end of alarm analysis period E in time sequence, or the date and time of end of molding work Te (ID) is date and time before the start of alarm analysis period S in time sequence, the result means that the data of that record are not included in the alarm analysis period, for example, in the period from Feb. 5, 1997, to Aug. 4, 1997 of the aforementioned example. Therefore, the host computer 1 skips Step h8 and the following steps and adds 1 to the value of the Schedule ID search index (Step h16).

If the judgment result of Step h7 is No, the result means that a part or the whole of the period of molding work of that record is included in the alarm analysis period. Therefore, the host computer 1 first determines the earliest date and time A of molding work of that record included in the alarm analysis period.

Specifically, a judgment is made as to whether the date and time of start of molding work Ts (ID) of that record is date and time before the start of alarm analysis period S in time sequence (Step h8). If the date and time of start of molding work Ts (ID) is date and time after the start of alarm analysis period S in time sequence, the date and time of start of molding work Ts (ID) is the earliest date and time A of molding work of that record (Step h9). If the date and time of start of molding work Ts (ID) is date and time before the start of alarm analysis period S in time sequence, the time before the date and time of start of alarm analysis period S is invalid, and the date and time of start of alarm analysis period S itself is the earliest date and time A of molding work of that record included in the alarm analysis period (Step h10).

Then, the host computer 1 determines the latest date and time B of molding work of that record included in the alarm analysis period.

Specifically, the host computer 1 judges whether the date and time of end of molding work Te (ID) of that record is date and time after the end of alarm analysis period E in time sequence (Step h11). If the date and time of end of molding work Te (ID) of that record is date and time before the end of alarm analysis period E in time sequence, the date and time of end of molding work Te (ID) is the latest date and time B of molding work of that record (Step h12), If the date and time of end of molding work Te (ID) of that record is date and time after the end of alarm analysis period E in time sequence, the time after the date and time of end of alarm analysis period E is invalid, and the date and time of end of alarm analysis period E itself is the latest date and time B of molding work of that record included in the alarm analysis period (Step h13).

Then, the host computer 1 reads a detailed classification item element Y (ID) stored in the column of the detailed classification item W of a record which is accessed by the host computer 1 at the present stage in the production result data storage file shown in FIG. 10 to identify the element of detailed classification item (Step h14). Thereafter, the host computer 1 reads the value of a total operation time integrating register by detailed classification item element Sum (Y(ID)) corresponding to this element among a large number of total operation time integrating registers by detailed classification item element Sum (k), determines the molding work time of that record included in the alarm analysis period by subtracting the earliest date and time A of molding work of the aforesaid record from the latest date and time B of molding work of that record, adds this time (B-A) to the total operation time integrating register by detailed classification item element Sum (Y(ID)), and updates and stores the obtained value as the value of the total operation time integrating register Sum (Y(ID)) (Step h15).

For example, if the selected classification item U is item by machine, an injection molding machine of a specific element, for example, Machine No. 3 (=V) is selected from the classification item U, and item by time zone (=W) is selected from the pull-down menu of detailed classification item, all data of the record other than the value of classification item U of the accessed record, that is, the value 3 of Machine No. are ignored by the judgment processing in Step h6. Also, even if the value of Machine No. is 3, if the data of molding period of that record is the data out of the alarm analysis period, the data of that record is ignored by the judgment processing in Step h7.

Specifically, the record to be evaluated in this case is only a record in which the value of Machine No. is 3 and the data of the molding period is included in the alarm analysis period in any form. For example, if the host computer 1 accesses the record of data address 2 at the present stage in accordance with the value of Schedule ID=2, in the case of the example shown in FIG. 10, the value of field of the classification item U in the record of data address 2, that is, the value in the column of item by machine is Machine No. 3 (the judgment result of Step h6 is Yes), and moreover the data of the molding period is 1997/07/05 to 1997/07/06, being included in the period from Feb. 5, 1997, to Aug. 4, 1997 (the judgment result of Step h7 is No). Therefore, this record is a record to be evaluated.

In this case, since the field Y (ID) by time zone, which is the detailed classification item W, stores time from 17:00 to 17:59, the aforesaid value of (B-A) is added to the total operation time integrating register by detailed classification item element Sum (Y(ID)) provided by time zone, in effect, the total operation time integrating register by detailed classification item element Sum (17). That is to say, when the detailed classification item W is item by time zone, the total operating time Sum (k) for k=1 to 24 is determined for each time zone of one hour interval, which is the element.

Then, the host computer 1 adds 1 to the value of the Schedule ID search index (Step h16), and judges whether the present value of the Schedule ID search index exceeds the final value IDmax of data address of the production result data storage file (Step h17).

If the present value of the Schedule ID search index does not exceed the final value Idmax of data address, the judgment result means that there may be another record which belongs to the specific element V selected from the classification item U and is included in the alarm analysis period. Therefore, the host computer 1 proceeds again to the processing in Step h6, accesses the production result data storage file shown in FIG. 10 based on the value of the Schedule ID search index updated by the processing in Step h16, by which the same processing as described before is repeatedly executed.

Therefore, finally, when the present value of the Schedule ID search index exceeds the final value IDmax of data address of the production result data storage file, and the judgment result of Step h17 becomes Yes, the total operating time of injection molding machine is summed up and stored in the total operating time integrating register by detailed classification item element Sum (k) through the date of alarm analysis period for each element of detailed classification item W assigned by the operator in the processing in Step d18, for example, for each time zone of one hour interval only regarding the specific element V of the classification item U assigned by the operator in the processing in Step d18, for example, the injection molding machine of Machine No. 3, only for the molding work time included between the date and time of start of alarm analysis period S and the date and time of end of alarm analysis period E.

The host computer 1, which finished the process in Step d19, then starts the processing (detailed classification item analysis display processing) in Step d20 for determining and displaying the number of alarm occurrences for each element of detailed classification item W for the alarm analysis period belonging to the specific element V of the classification item U, the alarm suspension time for each element, the ratio of the number of alarm occurrence to the total operating time for each element, and the ratio of the alarm suspension time to the total operating time for each element.

Figure 21:
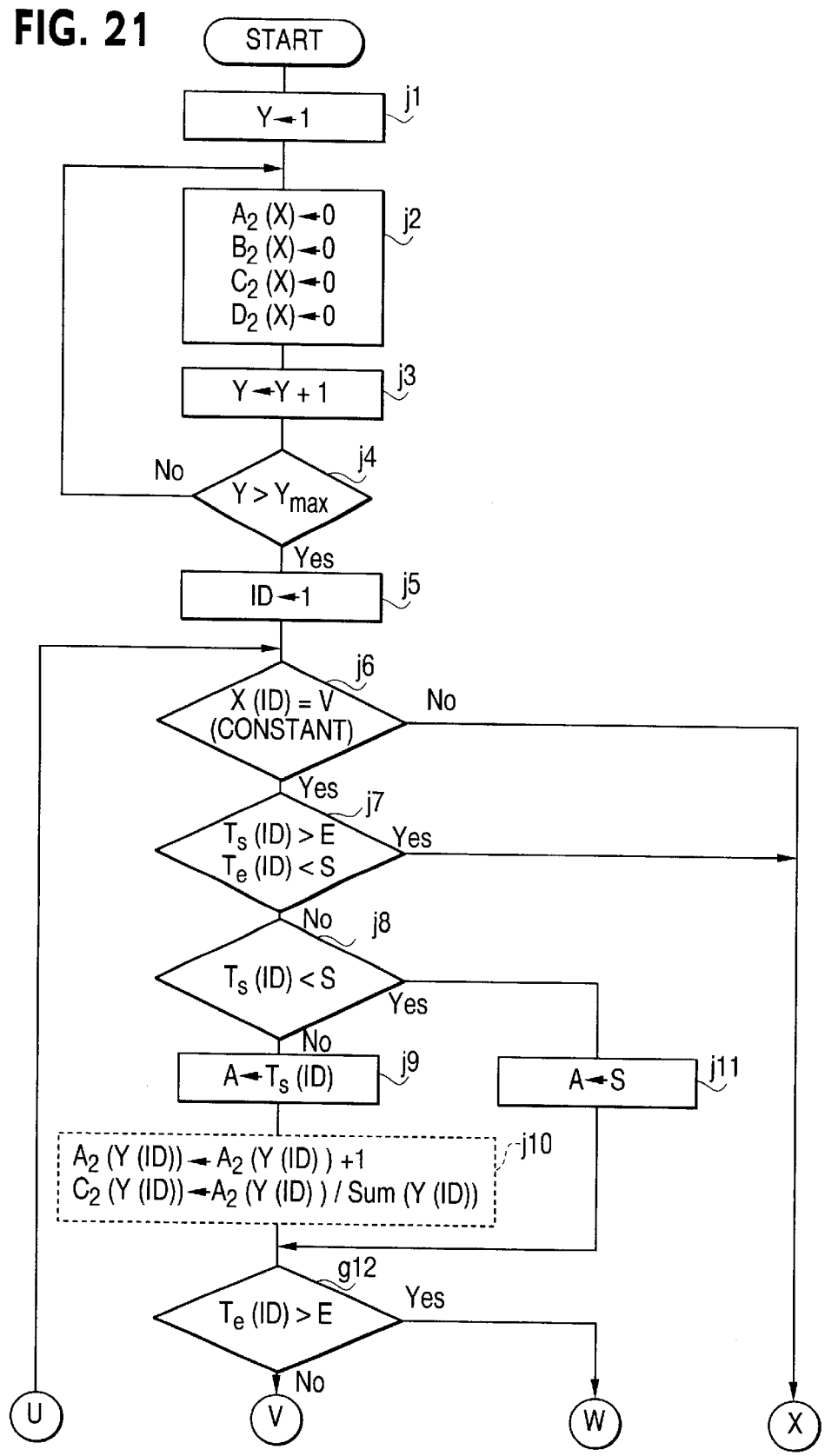
FIG. 21 is a flowchart showing the outline of detailed classification item analysis display processing.
Figure 22:
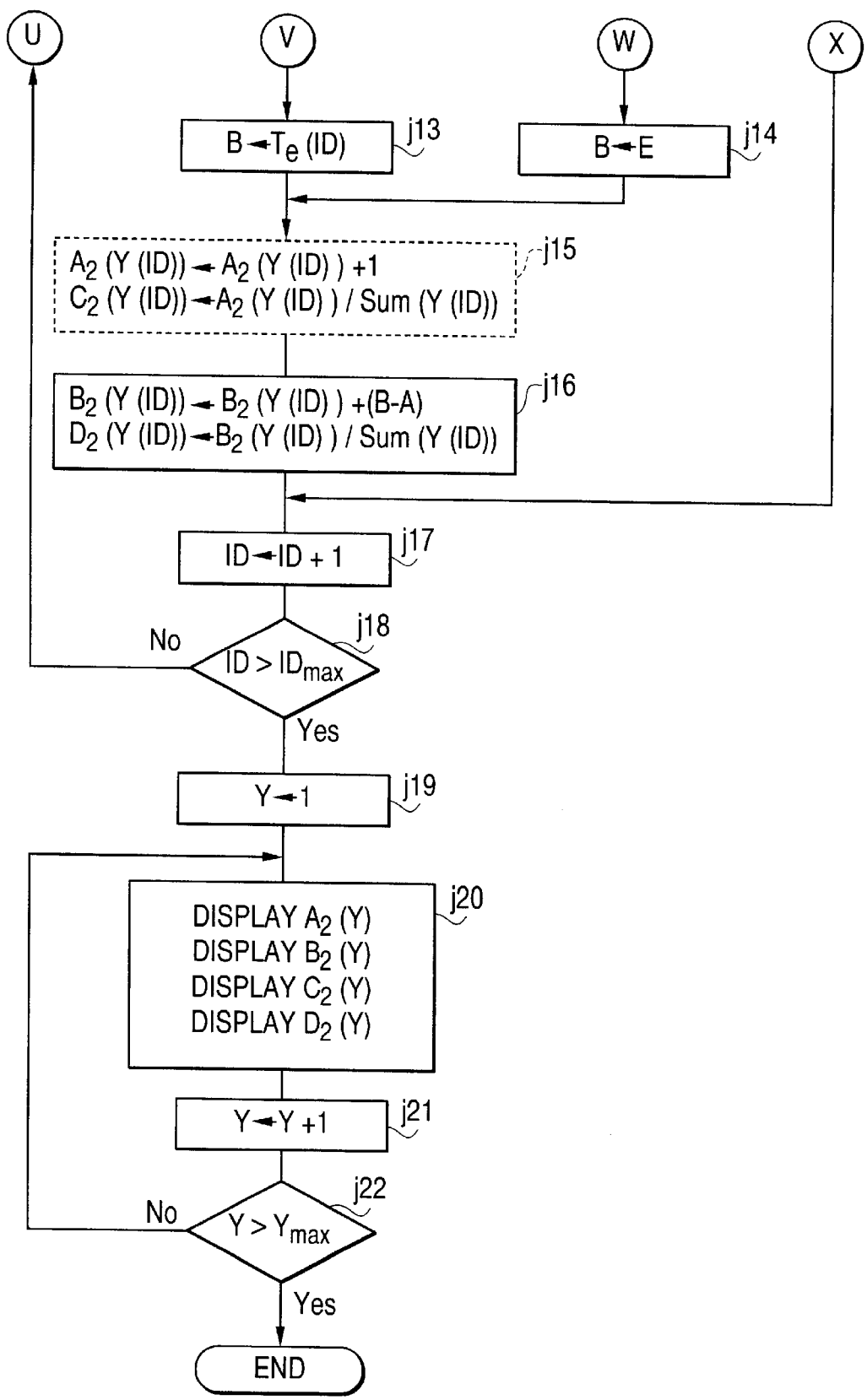
FIG. 22 is a continuance of flowchart showing the outline of detailed classification item analysis display processing.

The detailed classification item analysis display processing will be explained below with reference to the flowcharts shown in FIGS. 21 and 22.

The host computer 1, which started the detailed classification item analysis display processing, first sets an initial value 1 to the element identification index Y for identifying the element of detailed classification item W (Step j1), and initializes each value of an alarm occurence number storage register by detailed classification item element A2(Y), an alarm suspension time storage register by detailed classification item element B2(Y), an alarm occurrence number ratio storage register by detailed classification item element C2(Y), and an alarm suspension time ratio storage register by detailed classification item element D2(Y) corresponding to the index Y to zero (Step j2). Thereafter, the host computer 1 adds 1 to the value of the index Y (Step j3), and then judges whether the value of the index Y exceeds the value of the number of elements Ymax of detailed classification item (Step j4).

For example, if the selected detailed classification item W is item by time zone of one hour interval, the alarm occurrence number storage register by detailed classification item element A2(Y) is a register for summing up and storing the number of alarm occurrence taking place during the specific time zone identified by the index Y for the alarm analysis period in relation to the element V selected from the classification item U, and the alarm suspension time storage register by detailed classification item element B2(Y) is a register for summing up and storing the alarm suspension time occurring during the specific time zone identified by the index Y. Also, the alarm occurrence number ratio storage register by detailed classification item element C2(Y) a register for storing the ratio of the number of alarm occurrences taking place during the specific time zone identified by the index Y, and the alarm suspension time ratio storage register by detailed classification item element D2(Y) is a register for storing the ratio of the alarm suspension time occurring during the specific time zone identified by the index Y. If the interval of time zone is one hour, the total number Ymax of each register is 24.

If the judgement result of Step j4 is No, the result means that there are other various registers to be initialized. Therefore, the lost computer 1 proceeds again to the processing in Step j2, and repeatedly executes the processing to initialize the values of various registers corresponding to the element identification index Y updated by the processing in Step j3 to zero.

The same processing as described above is repeatedly executed until the judgment result of Step j4 becomes Yes. Finally, when the judgment result of Step j4 becomes Yes, the values of all of the alarm occurrence number storage register by detailed classification item element A2(Y), the alarm suspension time storage register by detailed classification item element B2(Y), the alarm occurrence number ratio storage register by detailed classification item element C2(Y), and the alarm suspension time ratio storage register by detailed classification item element D2(Y) corresponding to each of elements forming the detailed classification item W, that is, all registers of Y=1 to Ymax are initialized to zero.

Then, the host computer 1 sets an initial value 1 of address to the alarm ID search index (Step j5), accesses a record corresponding to the present value of alarm ID search index in the alarm data storage file shown in FIG. 9, reads the classification item element X (ID) stored in the column of the classification item U of that record, and judges whether the specific element V selected from the classification item U by the processing in Step d18 agrees with the aforesaid X (ID) (Step j6).

If the selected specific element V does not agree with X (ID), the judgment result means that the data stored in this record has no relation with the specific element V selected from the classification item U, for example, the injection molding work using the injection molding machine of Machine No. 3. Therefore, the host computer 1 skips Step j7 and the following steps and adds 1 to the value of the alarm ID search index (Step j17).

If the selected specific element V agrees with X (ID), the host computer 1 further reads the value Ts (ID) of field of Start Date/Time (date and time of alarm occurrence) and the value Te (ID) of field of End Date/Time (date and time of alarm end) of that record, and judges whether the date and time of alarm occurrence Ts (ID) is date and time after the end of alarm analysis period E in time sequence, and whether the date and time of alarm end Te (ID) is date and time before the start of alarm analysis period S in time sequence (Step j7).

If the judgment result of Step j7 is Yes, that is, if the date and time of alarm occurrence Ts (ID) of that record is date and time after the end of alarm analysis period E in time sequence, or the date and time of alarm end Te (ID) is date and time before the start of alarm analysis period S in time sequence, the result means that the data of that record are not included in the alarm analysis period, for example, the period from Feb. 5, 1997, to Aug. 4, 1997 of the aforementioned example. Therefore, the host computer 1 skips Step j8 and the following steps and adds 1 to the value of the alarm ID search index (Step j17).

If the judgment result of Step j7 is No, the result means that a part or the whole of the period of alarm occurrence of that record is included in the alarm analysis period. Therefore, the host computer 1 first determines the earliest date and time A of alarm period of that record included in the alarm analysis period.

Specifically, a judgment is made as to whether the date and time of alarm occurrence Ts (ID) of that record is date and time before the start of alarm analysis period S in time sequence (Step j8). If the date and time of alarm occurrence Ts (ID) is date and time after the start of alarm analysis period S in time sequence, the date and time of alarm occurrence Ts (ID) is the earliest date and time A of alarm period of that record (Step j9). If the date and time of alarm occurrence Ts (ID) is date and time before the start of alarm analysis period S in time sequence, the time before the date and time of start of alarm analysis period S is invalid, and the date and time of start of alarm analysis period S itself is the earliest date and time A of alarm period of that record included in the alarm analysis period (Step j11).

Further, if the date and time of alarm occurrence Ts (ID) becomes date and time after the start of alarm analysis period S in time sequence, that is, if the judgment result of Step j8 is No, the result means that an alarm occurred for the alarm analysis period. Therefore, in order to count this alarm as the alarm occurring for the alarm analysis period, the host computer 1 reads a detailed classification item element Y (ID) stored in the column of the detailed classification item W of a record which is accessed by the host computer 1 at the present stage in the alarm data storage file shown in FIG. 9 to identify the element of detailed classification item. Thereafter, the host computer 1 reads the value of the alarm occurrence number storage register by detailed classification item element A2(Y(ID)) corresponding to this element among a large number of alarm occurrence number storage registers by detailed classification item element A2(Y), adds 1 to the register A2(Y(ID)), and updates and stores the value in the alarm occurrence number storage register by detailed classification item element A2(Y(ID)). Also, the host computer 1 determines the ratio of the number of alarm occurrence to the total operating time of the element by dividing the value of the alarm occurrence number storage register by detailed classification item element A2(Y(ID)) by the value of the total operating time integrating register by detailed classification item element Sum (Y(ID)) corresponding to this element determined by the processing in Step h15, and stores the determined value in the alarm occurrence number ratio storage register by detailed classification item element C2(Y(ID)) (Step j10).

The processing in Step j10 is processing which is selectively executed when the date and time of alarm occurrence (momentary date and time of alarm occurrence) for the alarm analysis period counts only a certain alarm, and is not executed when all alarms overlapping with the alarm analysis period are counted regardless of where the date and time of alarm occurrence lies. If all alarms overlapping with the alarm analysis period are counted regardless of where the date and time of alarm occurrence lies, the processing in Step j15, described later, is executed in place of the processing in Step j10.

Then, the host computer 1 determines the latest date and time B of alarm period of that record included in the alarm analysis period.

Specifically, the host computer 1 judges whether the date and time of alarm end Te (ID) is date and time after the end of alarm analysis period E in time sequence (Step j12). If the date and time of alarm end Te (ID) of that record is date and time before the end of alarm analysis period E in time sequence, the date and time of alarm end Te (ID) is the latest date and time B of alarm period of that record (Step j13). If the date and time of alarm end Te (ID) of that record is date and time after the end of alarm analysis period E in time sequence, the time after the date and time of end of alarm analysis period E is invalid, and the date and time of end of alarm analysis period E itself is the latest date and time B of alarm period of that record included in the alarm analysis period (Step j14).

As described above, if all alarms overlapping with the alarm analysis period are counted regardless of where the date and time of alarm occurrence lies, the processing in Step j15 is executed in place of the processing in Step j10.

In this case, all alarms in which a part or the whole of the period of alarm occurrence is included in the alarm analysis period are added to the corresponding alarm occurrence number storage register by detailed classification item element A2(Y(ID)), and the ratio C2(Y(ID)) of the number of alarm occurrences to the total operating time of the element is determined (Step g15).

Then, the host computer 1 reads a detailed classification item element Y (ID) stored in the column of the detailed classification item W of a record which is accessed by the host computer 1 at the present stage in the alarm data storage file shown in FIG. 9 to identify the element of detailed classification item, determines the suspension time of molding work caused by alarm occurrence by subtracting the earliest date and time A of alarm period from the latest date and time B of alarm period, reads the value of the alarm suspension time storage register by detailed classification item element B2(Y(ID)) corresponding to this element among a large number of alarm suspension time storage registers by detailed classification item element B2(Y) as described above, adds the suspension time (B-A) of molding work to the value of the register B2(Y(ID)), and updates and stores the value in the alarm suspension time storage register by detailed classification item element B2(Y(ID)). Also, the host computer 1 determines the ratio of the alarm suspension time to the total operating time of the element by dividing the value of the alarm suspension time storage register by detailed classification item element B2(Y(ID)) by the value of the total operating time integrating register Sum (Y(ID)) corresponding to this element determined by the process in Step h15, and stores the determined value in the alarm suspension time ratio storage register by detailed classification item element D2(Y(ID)) (Step j16).

For example, if the selected classification item U is item by machine, an injection molding machine of a specific element, for example, Machine No. 3 (=V) is selected from the classification item U, and item by time zone (=W) is selected from the pull-down menu of detailed classification items, all data of the record other than the value of classification item U of the accessed record, that is, the value 3 of Machine No. are ignored by the judgment processing in Step j6. Also, even if the value of Machine No. is 3, if the data of molding period of that record is the data out of the alarm analysis period, the data of that record is ignored by the judgment processing in Step j7.

Specifically, the record to be evaluated in this case is only a record in which the value of Machine No. is 3 and the data of the molding period is included in the alarm analysis period in any form.

For example, if the classification item U selected by the processing in Step d15 is item by machine, the injection molding machine of Machine No.3 (=V) is selected by the processing in Step d18, and the host computer 1 accesses the record of address of alarm ID=3 in accordance with the value 3 of alarm ID search index, in the case of the example shown in FIG. 9, the value of field of the classification item U in the record of alarm ID=3, that is, the value X (ID) in the column of item by machine is 3, so that the judgment result of Step j6 is Yes, and moreover the data of the alarm occurrence period is 1997/07/22, being included in the period from Feb. 5, 1997, to Aug. 4, 1997 (the judgment result of Step j7 is No). Therefore, this record is a record to be evaluated.

In this case, since the field Y (ID) by time zone, which is the detailed classification item W, stores time from 3:00 to 3:59, the value of the alarm occurrence number storage register by detailed classification item element A2(Y(ID)) provided by time zone, in effect, the alarm occurrence number storage register by detailed classification item element A2(3) is counted up and the value is divided by the value of the total operating time integrating register by detailed classification item element Sum (3) determined by the processing in Step h5 and stored in the alarm occurrence number ratio storage register by detailed classification item element C2(3). Also, in the processing in Step j16, the aforesaid value of (B-A) is added to the alarm suspension time storage register by detailed classification item element B2(Y(ID)), that is, the alarm suspension time storage register by detailed classification item element B2(3), and the value is divided by the value of the total operating time integrating register by detailed classification item element Sum (3) determined by the processing in Step h15 and stored in the alarm suspension time ratio storage register by detailed classification item element D2(3).

That is to say, when the detailed classification item W is item by time zone, A2(Y), B2(Y), C2(Y) and D2(Y) corresponding to Y=1 to 24 for each time zone of one hour interval, which is the element, are determined.

Then, the host computer 1 adds 1 to the value of the alarm ID search index (Step j17), and judges whether the value of the alarm ID search index exceeds the final value IDmax of data address (Step j18).

If the present value of the alarm ID search index does not exceed the final value Idmax, the judgment result means that there may be another record which belongs to the specific element V selected from the classification item U and is included in the alarm analysis period. Therefore, the host computer 1 proceeds again to the processing in Step j6, accesses the alarm data storage file shown in FIG. 9 based on the value of the alarm ID search index updated by the processing in Step j17, by which the same processing as described before is repeatedly executed.

Therefore, finally, when the present value of the alarm ID search index exceeds the final value IDmax of address, and the judgment result of Step j18 becomes Yes, the number of alarm occurrences included between the date and time of start of alarm analysis period S and the date and time of end of alarm analysis period E regarding the specific element V of the classification item U assigned by the operator in the processing in Step d18, for example, the injection molding machine of Machine No. 3 is stored in the alarm occurrence number storage register by detailed classification item element A2(Y) for each element of Y=1 to Ymax constituting the detailed classification item W assigned by the operator in the processing in Step d18. Also, each of the integrated value of alarm occurrence time, the ratio of the number of alarm occurrences, and the ratio of alarm suspension time is stored in each of the alarm suspension time storage register by detailed classification item element B2(Y), the alarm occurrence number ratio storage register by detailed classification item element C2(Y), and the alarm suspension time ratio storage register by detailed classification item element D2(Y) for each element of Y=1 to Ymax.

That is to say, as described above, when item by machine is selected from the classification item U, item by time zone is selected as the detailed classification item W after assigning the injection molding machine of Machine No. 3 as the element V, regarding the injection molding work performed by the injection molding machine of Machine No. 3 for the period from Feb. 5, 1997, to Aug. 4, 1997, the number of alarm occurrences A2(1) to A2(Ymax) taking place in each time zone of one hour interval, the alarm suspension time B2(1) to B2(Ymax), the ratio of the number of alarm occurrences C2(1) to C2(Ymax), and the ratio of the alarm suspension time D2(1) to D2(Ymax) are all determined.

Next, the host computer 1 initializes the value of the element identification index Y to 1 (Step j19), displays each value of the number of alarm occurrences A2(Y), the alarm suspension time B2(Y), the ratio C2(Y) of the number of alarm occurrences, and the ratio D2(Y) of the alarm suspension time as the analysis result so as to correspond to element Y of the detailed classification item on the lower half of the alarm analysis screen as shown in FIG. 3, and at the same time, displays the situation by a bar graph (Step j20).

Then, the host computer 1 adds 1 to the value of the element identification index Y (Step j21), and judges whether the present value of the index Y exceeds the final value Ymax of the number of elements (Step j22). If the present value of the index Y does not exceed the final value Ymax, the judgment result means that there is another element for which the analysis result is to be displayed. Therefore, the host computer 1 proceeds again to the processing in Step j20, repeatedly executes the same processing as described before based on the value of the index Y updated by the processing in Step j21, and repeatedly displays the analysis result of each item of the number of alarm occurrences A2(Y), the alarm suspension time B2(Y), the ratio C2(Y) of the number of alarm occurrences, and the ratio D2(Y) of the alarm suspension time regarding the next element by numerical display and bar graph.

When the judgment result of Step j22 finally becomes Yes, the display of each value of the number of alarm occurrences A2(1) to A2(Xmax), the alarm suspension time B2(1) to B2(Xmax), the ratio C2(1) to C2(Xmax) of the number of alarm occurrences, the ratio D2(1) to D2(Xmax) of the alarm suspension time corresponding to each of the elements 1 to Ymax is completed.

FIG. 3 shows, as an example, a monitor screen on which the alarm analysis period is limited to a period from Feb. 5, 1997, to Aug. 4, 1997, the item by machine is selected from the classification item U, and item by time zone is selected as the detailed classification item W after assigning the injection molding machine of Machine No. 3 as the element V. In the field of the left end of the numerical display column shown on the lower left half of the alarm analysis screen, time zone (in effect, the value of the index Y) is displayed. The number of alarm occurrences A2(Y) taking place in each time zone and the ratio D2(Y) of the alarm suspension time to the total operating time of in that time zone are displayed horizontally so as to correspond to the time zone. Also, in the graph display column shown on the lower right half of the alarm analysis screen, the ratio D2(Y) of the alarm suspension time corresponding to each time zone is displayed in the ordinate direction by choosing time zone as the abscissa by a bar graph.

The host computer 1, which thus finished the detailed classification item analysis display processing, judges whether the end of alarm analysis screen is selected by the operator (Step d21). If the end of alarm analysis screen is not selected, the host computer 1 returns again to the processing in Step d15, waits the selection operation of another classification item U or other operation, and repeatedly executes the processing by classification item and detailed classification item.

If the end of alarm analysis screen is selected, the host computer 1 further judges whether the end of alarm history screen is selected (Step d22). If the end of alarm history screen is selected, the host computer finishes all of the work regarding the alarm analysis processing. If the end of alarm history screen is not selected, the host computer 1 returns again to the processing in Step d4 for re-setting the alarm analysis period.

The above is a description, shown as one example, of a case where after item by injection molding machine is selected from the classification items and the number of alarm occurrences for each Machine No. and the ratio of the alarm suspension time to the operating time are displayed, Machine No. is further identified to V=3, item by time zone is selected as the detailed classification item W, and the number of alarm occurrences taking place on the injection molding machine of Machine No. 3 and the ratio of the alarm suspension time to the operating time are displayed by time zone of one hour interval. The combination of the classification item with the detailed classification item is free unless they do no overlap with each other. The operator can select the classification item and the detailed classification item arbitrarily from items by machine, by resin, by time zone, by schedule, by alarm, by alarm group, by product, etc. to perform the alarm analysis processing.

Also, in the above embodiment, there has been described a case where after a specific classification item is selected, only one specific element V constituting the classification item U is assigned, and a detailed classification item W is selected to perform the total operating time calculation processing by detailed classification item element (Step d19) and the detailed classification item analysis display processing (Step d20). However, if the detailed classification item W is fixed, and the total operating time calculation processing by detailed classification item element and the detailed classification item analysis display processing are performed for all elements constituting the classification item U, a three-dimensional graph display can be provided as shown in FIG. 23.

Figure 23:
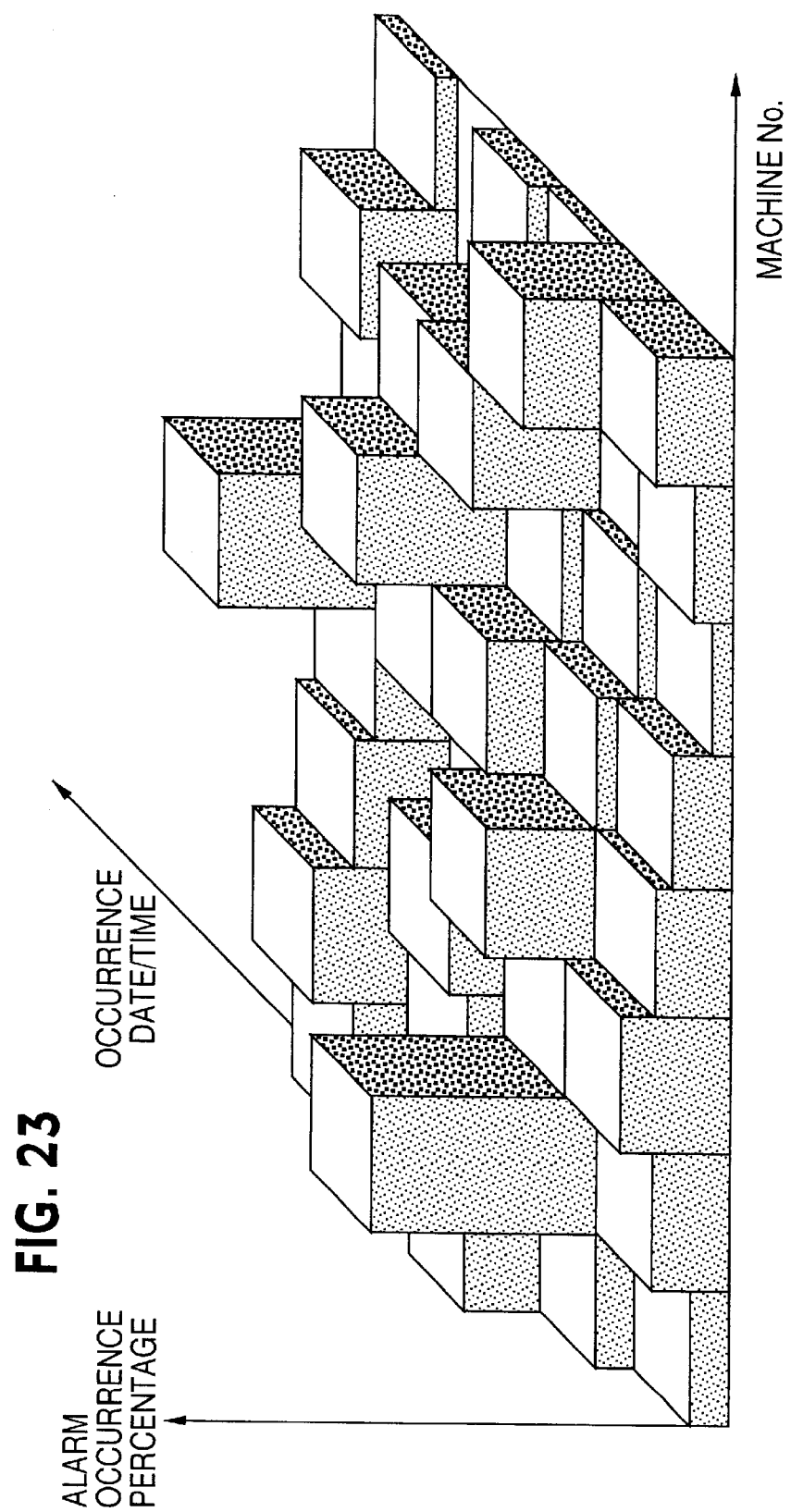
FIG. 23 is a view showing one example of a stereoscopic alarm analysis screen.

FIG. 23 shows a display result of a case where item by machine is selected as the classification item, and item by time zone is assigned as the detailed classification item W for the injection molding machines of all Machine Nos. to perform the total operating time calculation processing by detailed classification item element and the detailed classification item analysis display processing. In this case, the alarm occurrence percentage by time zone corresponding to each of the injection molding machines is displayed. Consequently, a graph is displayed such that the bar graph shown at the lower right of the monitor screen shown in FIG. 3 has a thickness and is laminated in the abscissa direction according to Machine No.

Figure 24:
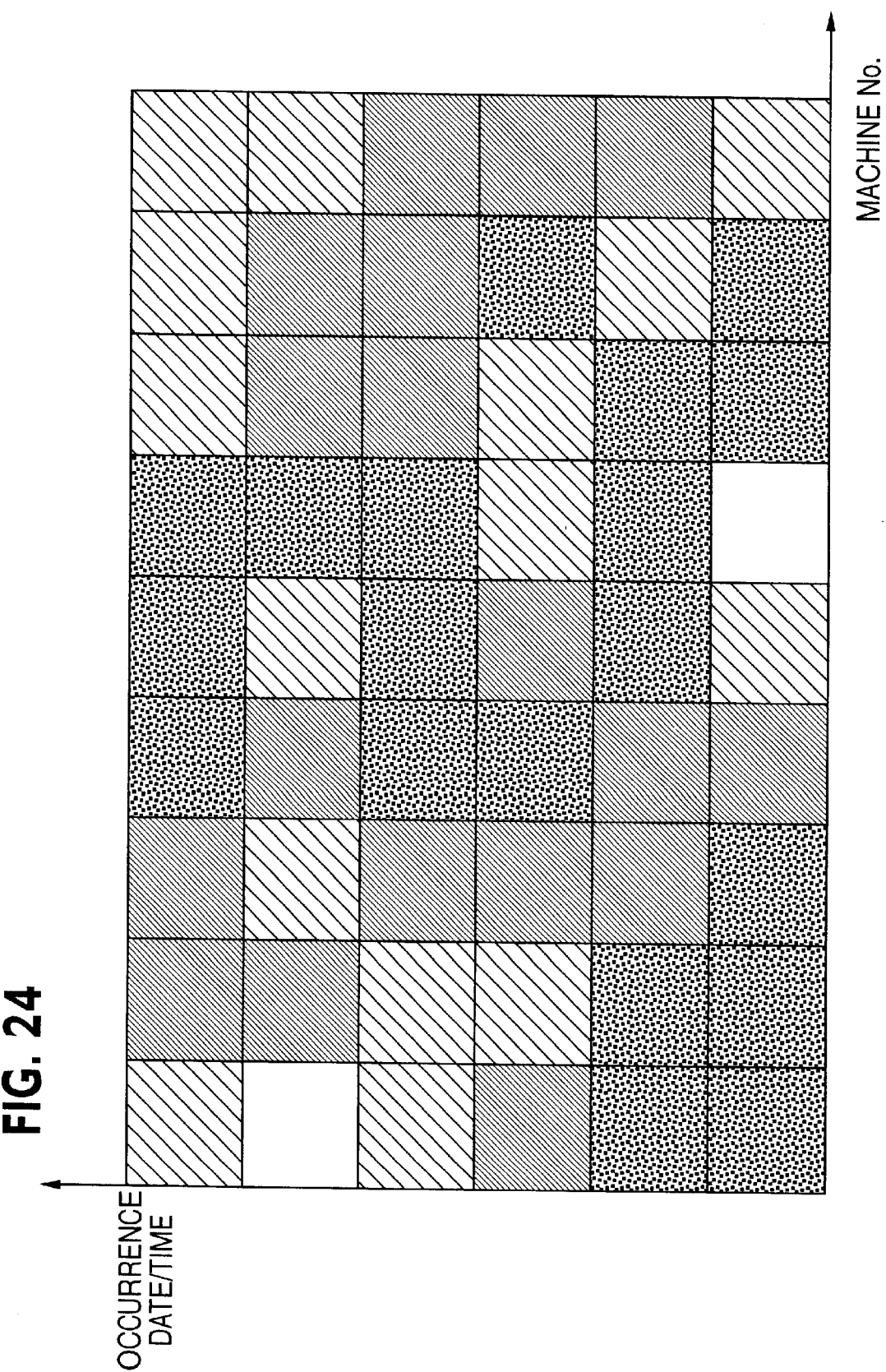
FIG. 24 is a view showing one example of a planar alarm analysis screen.

Also, if the height of graph shown in FIG. 23, that is, the height of alarm occurrence percentage is represented by the depth of color or the like, for example, the high alarm occurrence percentage is represented by black and the low one by white, the relationship between Machine No. of injection molding machine, time zone, and alarm occurrence percentage can be displayed by a planar graph display as shown in FIG. 24.

Figure 25:
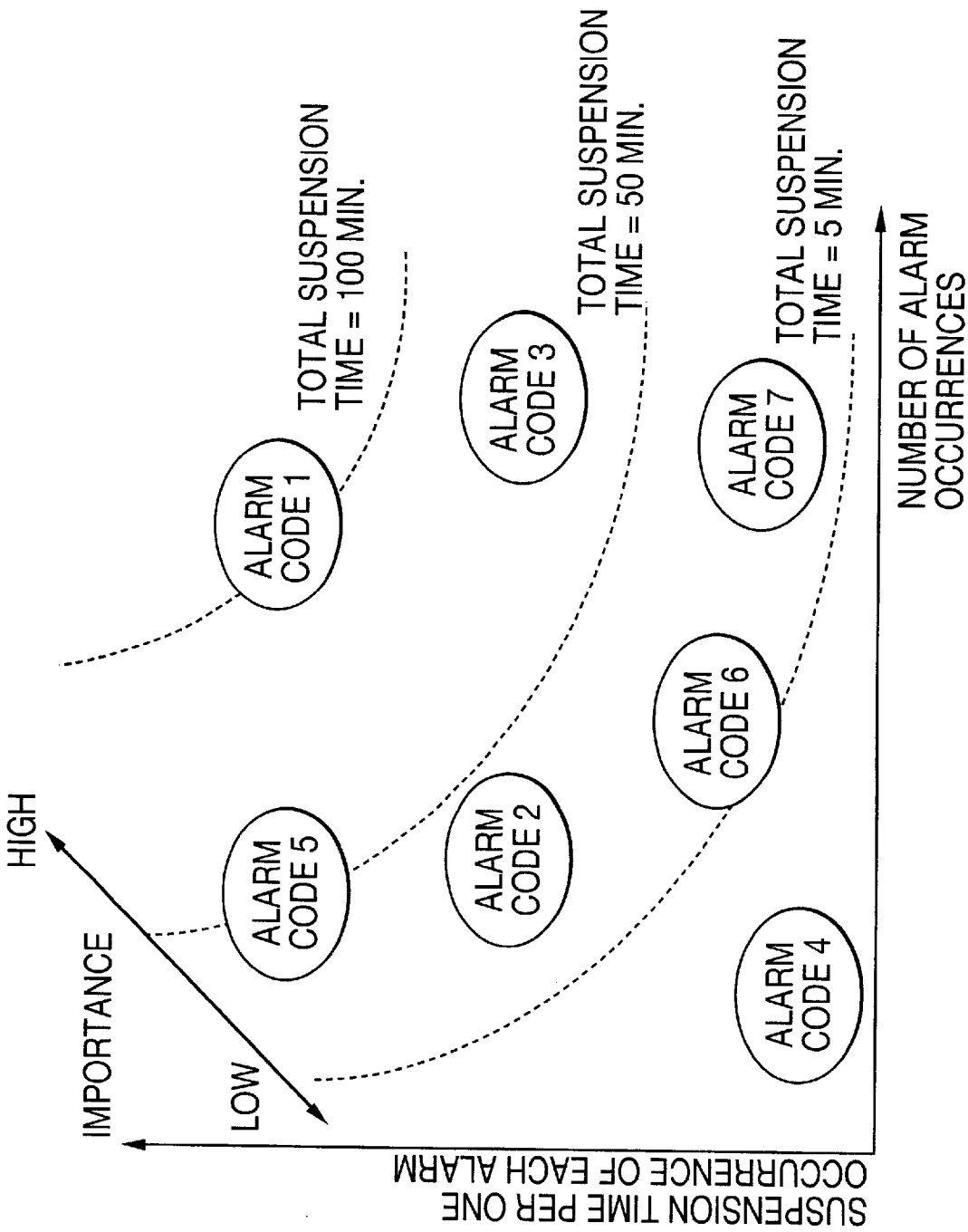
FIG. 25 is a schematic view showing one example of an alarm analysis screen using an importance judgment graph.

Further, by using the data obtained by the classification item analysis display processing explained with reference to FIGS. 17 and 18, that is, by using each value of the alarm occurrence number storage register by classification item element A1(X) and the alarm occurrence number ratio storage register by classification item element C1(X), the relationship between the number of alarm occurrences for each classification item X and the average alarm suspension time per one alarm occurrence can be displayed by an importance judgment graph as shown in FIG. 25.

Next, the display processing of the importance judgment graph with reference to the flowchart shown in FIG. 26. This processing can be performed in place of the detailed classification item analysis display processing shown in FIGS. 19 to 22.

As the classification item X, any of items by machine, by resin, by time zone, by schedule, by alarm group, by product, etc. may be selected. Here, as an example, a case where alarm code is selected as an item to be displayed will be explained.

The host computer 1, which started the display processing of importance judgment graph, first displays an coordinate system for graph display, in which the abscissa represents the number of occurrences and the ordinate represents the average suspension time, in the graph display column (Step p1). Then, the host computer 1 sets an initial value 1 to the element identification index X (Step p2), reads the value of the alarm occurrence number storage register by classification item element A1(X) corresponding to the present value of this index X, that is, the alarm occurrence number storage register by classification item element A1(X) corresponding to the alarm code X in this case, and judges whether one or more alarm occurrences are stored in this register (Step p3).

If one or more alarm occurrences are stored in the alarm occurrence number storage register by classification item element A1(X), the host computer 1 reads the value of the alarm occurrence number ratio storage register by classification item element C1(X) corresponding to the alarm code X, divides that value by the value of the alarm occurrence number storage register by classification item element A1(X) to determine the value of the average suspension time corresponding to one of alarm code X, that is, one occurrence (C1(X)/A1(X)), plots a point showing the relationship between the number of alarm occurrences and the average suspension time (A1(X), C1(X)/A1(X)) in the aforementioned rectangular coordinate system (Step p4), and displays the name X of alarm code at that position (Step p5).

If the value of the alarm occurrence number storage register by classification item element A1(X) is zero, the number of alarm occurrences not being stored, and the judgement result of Step p3 is No, the result means there is no data to be displayed as alarm occurrence. Therefore, the processing in Steps p4 and p5 are skipped.

Next, the host computer 1 adds 1 to the value of the element identification index X (Step p6), and judges whether the value of the index X reaches the total number Xmax of element of the selected classification item, that is, the number Xmax of the last alarm code in this case (Step p7).

If the value of the index X does not reach the total number Xmax of element, the judgment result means that there is another element whose data is to be displayed, that is, another alarm code in this case. Therefore, the host computer 1 repeatedly executes the processing in Steps p3 to p7 based on the present value of the index X updated by the processing in Step p6. If the number of alarm occurrences is stored in the newly read alarm occurrence number storage register by classification item element A1(X), the host computer 1 determines the value of the average suspension time corresponding to on alarm code in the same way as described before, plots a point showing the relationship between the number of alarm occurrences and the average suspension time in the rectangular coordinate system, and displays the name of alarm code.

Therefore, when the judgment result of Step p7 is Yes, and the value of the index X exceeds the total number Xmax of element, the relationship between the number of alarm occurrences and the average suspension time for all alarms for which the number of alarm occurrences are stored is displayed on the graph.

FIG. 25 shows one example of display result. Since the abscissa represents the number of alarm occurrence and the ordinate represents the average suspension time corresponding to one alarm occurrence as described already, this graph simply means that for the alarms displayed at the right of the abscissa, for example, alarm codes 1, 3 and 7, the probability of occurrence is high, and for the alarms displayed on the upside, for example, alarm codes 1 and 5, the suspension time of molding work caused by one occurrence is long, and it is relatively difficult to perform the restoration work.

Further, for the alarms displayed at positions far from the origin of the rectangular coordinate, for example, alarm codes 1 and 3, generally, the number of occurrences is large, and the suspension time of molding work caused by one occurrence is long, having a great adverse effect on the efficiency of molding work. Also, for alarms displayed at positions close to the origin of the rectangular coordinate, for example, alarm code 4, the number of occurrences is small, and the suspension time of molding work caused by one occurrence is short, having no great effect on the efficiency of molding work.

Needless to say, when the suspension time of molding work caused by one occurrence is remarkably long even if the number of occurrences is small, or when the alarm occurs frequently even if the suspension time of molding work caused by one occurrence is short, that is, for the alarms displayed at positions far from the coordinate origin close to the ordinate or abscissa, in effect, the alarms having a high value of C1(X), it can be thought that the adverse effect on the efficiency of molding work is great.

That is to say, finally, it can be thought that for the alarms having a high value of C1(X), in effect, the alarms in which the product of the coordinate value of abscissa and the coordinate value of ordinate is great, the adverse effect on the efficiency of molding work is great.

For this reason, in this embodiment, contour lines showing the magnitude of importance, which are indicated by the broken line in FIG. 25, are drawn. The contour lines are curves connecting points at which the values of abscissa coordinate value x ordinate coordinate value agrees with several appropriate set values, for example, the values Cx showing that the effect is little, the values Cy showing that the effect is medium, the value Cz showing that the effect is great, etc. Therefore, the contour line is a hyperbola as shown in FIG. 25 because abscissa coordinate value x ordinate coordinate value=constant.

That is to say, it can be thought that the alarms displayed on the same contour line has almost the same effect on the efficiency of molding work finally even if the number of occurrences or the work suspension time caused by one occurrence is different, and the alarms lying on the outside of curvature direction from the contour line have a little relative effect, and ones lying on the inside of curvature direction from the contour line has a great relative effect.

When a display capable of gradation display or color display is used, the gradation depth display, color display, or the like may be used in place of the contour lines as shown in FIG. 25.

The trouble of alarm code 1 shown in FIG. 25, in which the probability of occurrence is high and the suspension time is long, is an important problem which must be solved first. Also, although for the alarm codes 2, 5 and 7, the final effect itself on the molding work is almost the same, for the alarm code 2 of these alarm codes, because the relative probability of occurrence is low, it is difficult to find out the cause by catching the alarm occurrence, and on the other hand, for the alarm code 7, because the relative probability of occurrence is high, it is relatively easy to find out and eliminate the cause by catching the alarm occurrence.

Since the final improvement effect of molding work is the same whatever the alarm code 2, 5 or 7 is eliminated, when maintenance etc. is performed, a judgment can be made that the alarm code 7, in which the probability of occurrence is high, should be eliminated first.

As described above, by displaying the importance judgment graph showing the relationship between the number of alarm occurrences and the average suspension time per one occurrence, the relationship between the probability of alarm occurrence and the suspension time of molding work caused by one occurrence, the degree of adverse effect caused by a specific alarm on the final efficiency of molding work, the priority of alarm for which the problem should be solved, and the like can be judged clearly. Therefore, this display processing can expect a great effect as the analysis processing for improving the efficiency of molding work.

According to the present invention, the ratio of the number of alarm occurrences and alarm occurrence time can be analyzed and displayed on the basis of the assigned production time. Therefore, the occurrence of alarms, which is an essential problem, can be evaluated objectively without being subjected to the effect due to the length of substantial operating time (production time) of injection molding machine.

Also, the ratio of the number of alarm occurrences and the occurrence time can be analyzed in terms of any evaluation criterion such as items by injection molding machine, by time zone, by alarm type, by product, by resin, or by schedule, and moreover the analysis can be made by combining these items arbitrarily. Therefore, the operator can perform the analysis evaluation freely according to the request.

Further, since the graph is displayed which shows the relationship between the number of alarm occurrences and the average suspension time of molding work caused by one occurrence, the relationship between the number of occurrence of each element and the average suspension time of molding work for each alarm element, the degree of adverse effect caused by a specific alarm on the final efficiency of molding work, the priority of alarm for which the problem should be solved, and the like can be judged clearly. Therefore, the improvement in efficiency of molding work can be rationalized.

What is claimed is:

1. An alarm analyzing method for an injection molding machine, comprising the steps of:

(a) collecting data regarding occurrence information of each alarm, and at least one of data regarding date and time of start and end of each alarm, data regarding a type of resin used and a production schedule when each alarm occurred, and data regarding date and time of start and end of each operation; and (b) totalizing and displaying the number of alarms, a ratio of the number of alarms to operating time of the injection molding machine or a ratio of the number of alarms on a selected item to a total number of alarms for a designated period with respect to an item selected from items of a time zone of one day, a type of resin used and a production schedule, based on the data collected in said step (a).

2. An alarm analyzing method for an injection molding machine, comprising the steps of:
   (a) collecting data regarding date and time of start and end of each alarm, and at least one of data regarding occurrence information of each alarm, data regarding a type of each alarm, data regarding a type of resin used, a type of product and a production schedule when each alarm occurred, and data regarding date and time of start and end of each operation; and
   (b) totalizing and displaying time period of operation suspension caused by alarms, a ratio of the operation suspension time to operating time of the injection molding machine or a ratio of time period of the operation suspension caused by alarms on a selected item to the total number of alarms for a designated period with respect to an item selected from items of a time zone of one day, a type of product, a type of alarm, an alarm group, a type of resin used and a production schedule, based on the data collected in said step (a).

3. An alarm analyzing method for an injection molding machine, comprising the steps of:
   (a) collecting data regarding occurrence information of each alarm, and at least one of data regarding the date and time of start and end of each alarm, data regarding a type of each alarm, data regarding a type of resin used, a type of product and a production schedule when each alarm occurred, and data regarding date and time of start and end of each operation; and
   (b) toting and displaying the number of alarms, a ratio of the number of alarms to operating time of the injection molding machine or a ratio of the number of alarms of a selected item to a total number of alarms for a designated period with respect to combined two or more items selected from items of a time zone of one day, a type of product, a type of alarm, an alarm group, a type of resin used and a production schedule, based on the data collected in said step (a).

4. An alarm analyzing method for an injection molding machine, comprising the steps of:
   (a) collecting data regarding date and time of start and end of each alarm, and at least one of data regarding occurrence information of each alarm, data regarding a type of each alarm, data regarding a type of resin used, a type of product and a production schedule when each alarm occurred, and data regarding date and time of start and end of each operation; and
   (b) totalizing and displaying time period of operation suspension caused by alarms, a ratio of the operation suspension time caused by alarms to operating time of the injection molding machine or a ratio of time period of operation suspension caused by alarms on a selected item to the total number of alarms for a designated period with respect to combined two or more items selected from items of a time zone of one day, a type of product, a type of alarm, an alarm group, a type of resin used and a production schedule, based on the data collected in said step (a).

5. An alarm analyzing method for an injection molding machine, comprising the steps of:
   (a) collecting data regarding occurrence information of each alarm and data regarding date and time of start and end of each alarm, and at least one of data regarding a type of each alarm, data regarding a type of resin used, a type of product and a production schedule when each alarm occurred, and data regarding date and time of start and end of each operation; and
   (b) displaying a graph showing a relationship between the number of alarms and an average time period of operation suspension caused by one alarm for a designated period with respect to each element of item selected from items of a time zone of one day, a type of product, a type of alarm, an alarm group, a type of resin used and a production schedule, based on the data collected in said step (a).

6. An alarm analyzing method for an injection molding machine according to claim 5, wherein said step (b) includes a step of displaying contour lines on which a product of the number of alarms and the average suspension time is a set value, on said graph as a criterion for an effect caused by an element of each of said items on the molding operation.

7. An alarm analyzing method for a plurality of injection molding machines by using a host computer connected to said plurality of injection molding machines through a data transmission path, comprising the steps of:
   (a) collecting data regarding occurrence information of each alarm, and at least one of data regarding date and time of start and end of each alarm, data regarding a type of resin used, a type of product and a production schedule when each alarm occurred and data regarding date and time of start and end of each operation; and
   (b) totalizing and displaying the number of alarms, a ratio of the number of alarms to operating time of the injection molding machine or a ratio of the number of alarms on a selected item to the total number of alarms for a designated period with respect to an item selected from items of each injection molding machine, a time zone of one day, a type of product, a type of resin used and a production schedule, based on the data collected in said step (a).

8. An alarm analyzing method for a plurality of injection molding machines using a host computer connected to said plurality of injection molding machines through a data transmission path, said method comprising the steps of:
   (a) collecting data regarding date and time of start and end of each alarm, and at least one of data regarding occurrence information of each alarm, data regarding a type of each alarm, data regarding a type of resin used, a type of product and a production schedule when each alarm occurred, and data regarding date and time of start and end of each operation; and
   (b) totalizing and displaying a time period of an operation suspension caused by alarms, a ratio of the operation suspension time caused by alarms to operating time of the injection molding machine or a ratio of the operation suspension time caused by alarms on a selected item to the total number of alarms for a designated period with respect to an item selected from items of each injection molding machine, a time zone of one day, a type of product, a type of alarm, an alarm group, a type of resin used and a production schedule, based on the data collected in said step (a).

9. An alarm analyzing method for a plurality of injection molding machines using a host computer connected to said plurality of injection molding machines through a data transmission path, said method comprising the steps of:
   (a) collecting data regarding occurrence information of each alarm, and at least one of data regarding date and time of start and end of each alarm, data regarding a type of each alarm, data regarding a type of resin used, a type of product and a production schedule when each alarm occurred, and date and time of start and end of each operation; and (b) totalzing and displaying the number of alarms, a ratio of the number of alarms to operating time of the injection molding machine or a ratio of the number of alarms on a selected item to the total number of alarms for a designated period with respect to combined two or more items selected from items of each injection molding machine, a time zone of one day, a type of product a type of alarm, an alarm group, a type of resin used and a production schedule, based on the data collected in said step (a).

10. An alarm analyzing method for a plurality of injection molding machines using a host computer connected to said plurality of injection molding machines through a data transmission path, said method comprising the steps of:

(a) collecting data regarding date and time of start and end of each alarm, and at least one of data regarding occurrence information of each alarm, data regarding a type of each alarm, a type of resin used, a type of product and a production schedule when each alarm occurred, and data regarding date and time of start and end of each operation; and (b) totalizating and displaying time period of operation suspension caused by alarms, a ratio of the operation suspension time caused by alarms to operating time of the injection molding machine or a ratio of time period of operation suspension caused by alarms on a selected item to a total number of alarms for a designated period with respect to combined two or more items selected from items of each injection molding machine, a time zone of one day, a type of product, a type of alarm, an alarm group, a type of resin used and a production schedule, based on the data collected in said step (a).

11. An alarm analyzing method for a plurality of injection molding machines using a host computer connected to said plurality of injection molding machines through a data transmission path, said method comprising the steps of:

(a) collecting data regarding occurrence information of each alarm and data regarding date and time of start and end of each alarm, and at least one of data regarding a type of each alarm, data regarding a type of resin used, a type of product and a production schedule when each alarm occurred, and data regarding date and time of start and end of each operation; and (b) displaying a graph showing a relationship between the number of alarms and an average operation suspension time for one alarm for a designated period with respect to each element of item selected from items of each injection molding machine, a time zone of one day, a type of product, a type of alarm, an alarm group, a type of resin used and a production schedule, based on the data collected in said step (a).

12. An alarm analyzing method according to claim 11, wherein said step (b) includes a step of displaying contour lines on which a product of the number of alarms and the average suspension time is a set value, on said graph as a criterion for an effect caused by an element of each of said items on the molding operation.

13. An alarm analyzing method for an injection molding machine, comprising the steps of:

(a) collecting data regarding occurrence information of each alarm, and at least one of data regarding date and time of start and end of each alarm, data regarding a type of each alarm, data regarding a type of product when each alarm occurred and data regarding date and time of start and end of each operation; and (b) totalizing and displaying a ratio of the number of alarms to operating time of the injection molding machine or a ratio of the number of alarms on a selected item to a total number of alarms for a designated period with respect to an item selected from items of a type of product, a type of alarm and an alarm group, based on the data collected in said step (a).

14. An alarm analyzing method according to claim 1 wherein the designated period in said step (a) is set arbitrarily within the data collection period of said step (a).

15. An alarm analyzing method according to claim 1, further comprising a step of displaying the totalized result by numerical values or a graph.

16. An alarm analyzing apparatus for an injection molding machine, comprising:

collecting means for collecting data regarding date and time of start and end of each alarm, and at least one of data regarding occurrence information of each alarm, data regarding a type of each alarm, data regarding a type of resin used, a type of product and a production schedule when each alarm occurred, and data regarding date and time of start and end of each operation; and totalizing/displaying means for totalizing and displaying time period of operation suspension caused by alarms, a ratio of the operation suspension time to operating time or a ratio of time period of operation suspension caused by alarms on a selected item to a total number of alarms for a designated period with respect to an item selected from items of a time zone of one day, a type of product, a type of alarm, an alarm group, a type of resin used and a production schedule, based on the collected data.

17. An alarm analyzing apparatus for an injection molding machine, comprising:

data collecting means for collecting data regarding occurrence information of each alarm, and at least one of data regarding date and time of start and end of each alarm, data regarding a type of resin used and a production schedule when each alarm occurred and data regarding date and time of start and end of each operation; and totalizing/displaying means for totalizing and displaying the number of alarms, a ratio of the number of alarms to operating time of the injection molding machine or a ratio of the number of alarms of a selected item to a total number of alarms for a designated period with respect to an item selected from items of a time zone of one day, a type of resin used and a production schedule, based on the collected data.

18. An alarm analyzing apparatus according to claim 17, wherein said totalizing/displaying means displays a totalized result numerical values or a graph.

19. An alarm analyzing apparatus for an injection molding machine, comprising:

collecting means for collecting data regarding occurrence information of each alarm, and at least one of data regarding date and time of start and end of each alarm, data regarding a type of each alarm, data regarding a type of resin used, a type of product and a production schedule when each alarm occurred, and data regarding date and time of start and end of each operation; and totalizing/displaying means for totalizing and displaying the number of alarms, a ratio of the number of alarms to operating time of the injection molding machine or a ratio of the number of alarms on a selected item to a total number of alarms for a designated period with respect to combined two or more items selected from items of a time zone of one day, a type of product, a type of alarm, an alarm group, a type of resin used and a production schedule, based on the collected data.

20. An alarm analyzing apparatus for an injection molding machine, comprising:

collecting means for collecting data regarding date and time of start and end of each alarm, and at least one of data regarding occurrence information of each alarm, data regarding a type of each alarm, a type of resin used, a type of product and a production schedule when each alarm occurred, and data regarding date and time of start and end of each operation; and totalizing/displaying means for totalizing and displaying time period of operation suspension caused by alarms, a ratio of the operation suspension time caused by alarms to operating time of the injection molding machine or a ratio of time period of operation suspension caused by alarms on a selected item to the total number of alarms for a designated period with respect to combined two or more items selected from items of a time zone of one day, a type of product, a type of alarm, an alarm group, a type of resin used and a production schedule, based on the collected data.

21. An alarm analyzing apparatus for an injection molding machine, comprising:

collecting means for collecting data regarding occurrence information of each alarm and data regarding date and time of start and end of each alarm, and at least one of data regarding a type of each alarm, data regarding a type of resin used, a type of product and a production schedule when each alarm occurred, and data regarding date and time of start and end of each operation; and totalizing/displaying means for displaying a graph showing a relationship between the number of alarms and an average operation suspension time for one alarm for a designated period with respect to each element of an item selected from items of a time zone of one day, a type of product, a type of alarm, an alarm group, a type of resin used and a production schedule, based on the collected data.

22. An alarm analyzing apparatus for an injection molding machine according to claim 21, wherein said totalizing/displaying means displays contour lines on which a product of the number of alarms and the average suspension time is a set value, on said graph as a criterion for an effect caused by an element of each of said items on the molding operation.

23. An alarm analyzing apparatus for an injection molding machine, comprising:

collecting means for collecting data regarding occurrence information of each alarm, and at least one of data regarding date and time of start and end of each alarm, data regarding a type of each alarm, data regarding a type of product when each alarm occurred and data regarding date and time of start and end of each operation; and totalizing/displaying means for totalizing and displaying a ratio of the number of alarms to operating time of the injection molding machine or a ratio of the number of alarms on a selected item to the total number of alarms for a designated period with respect to an item selected from items of a type of product, a type of alarm and an alarm group, based on the collected data.

24. An alarm analyzing apparatus according to claim 17, wherein said designated period is set arbitrarily within said data collection period.

* * * * *

UNITED STATES PATENT AND TRADEMARK OFFICE
CERTIFICATE OF CORRECTION

PATENT NO.   : 6,308,141 B1
DATED        : October 23, 2001
INVENTOR(S)  : Osamu Saito et al.

It is certified that error appears in the above-identified patent and that said Letters Patent is hereby corrected as shown below:

<u>Title page,</u>
Item [75], change "Yamanashi" to -- Minamitsuru --, both occurrences.

<u>Column 5,</u>
Line 64, change "cade" to -- code --.

<u>Column 7,</u>
Line 1, change "tile" to -- file --.

<u>Column 12,</u>
Line 38, change "F" to -- E --.

<u>Column 15,</u>
Line 43, change "F" to -- E --, and insert -- , -- after "sequence".

<u>Column 16,</u>
Line 18, delete [,] second occurrence.

<u>Column 18,</u>
Line 67, change "(ED)" to -- (ID) --.

<u>Column 22,</u>
Line 53, change "(Step b6)" to -- (Step h6) --.

<u>Column 29,</u>
Line 4, insert -- , -- after "up"

UNITED STATES PATENT AND TRADEMARK OFFICE
CERTIFICATE OF CORRECTION

PATENT NO.   : 6,308,141 B1
DATED        : October 23, 2001
INVENTOR(S)  : Osamu Saito et al.

It is certified that error appears in the above-identified patent and that said Letters Patent is hereby corrected as shown below:

<u>Column 37,</u>
Line 7, insert -- , -- after "product".

Signed and Sealed this

Second Day of July, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,308,141 B1
DATED         : October 23, 2001
INVENTOR(S)   : Osamu Saito et al.

It is certified that error appears in the above-identified patent and that said Letters Patent is hereby corrected as shown below:

Column 35,
Line 29, change "toting" to -- totalizing --.

Signed and Sealed this

Third Day of December, 2002

JAMES E. ROGAN
*Director of the United States Patent and Trademark Office*